United States Patent
Dumont et al.

(10) Patent No.: US 11,428,572 B2
(45) Date of Patent: *Aug. 30, 2022

(54) METHODS, SYSTEMS, AND APPARATUSES FOR ACCURATE MEASUREMENT OF HEALTH RELEVANT UV EXPOSURE FROM SUNLIGHT

(71) Applicant: YouV Labs, Inc., New York, NY (US)

(72) Inventors: Emmanuel Dumont, New York, NY (US); Peter Kaplan, Montclair, NJ (US)

(73) Assignee: YouV Labs, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,078

(22) Filed: Dec. 28, 2020

(65) Prior Publication Data

US 2021/0116296 A1    Apr. 22, 2021

Related U.S. Application Data

(63) Continuation of application No. 16/659,427, filed on Oct. 21, 2019, now Pat. No. 10,876,886.

(60) Provisional application No. 62/748,233, filed on Oct. 19, 2018.

(51) Int. Cl.
*G01J 1/42* (2006.01)
*G01J 1/04* (2006.01)
*G01J 1/44* (2006.01)
*G01J 1/16* (2006.01)

(52) U.S. Cl.
CPC ............. *G01J 1/429* (2013.01); *G01J 1/0488* (2013.01); *G01J 1/16* (2013.01); *G01J 1/44* (2013.01); *G01J 2001/1657* (2013.01); *G01J 2001/444* (2013.01)

(58) Field of Classification Search
CPC ...... G01J 1/16; G01J 1/429; G01J 1/44; G01J 2001/1657; G01J 2001/444
See application file for complete search history.

(56) References Cited

U.S. PATENT DOCUMENTS

| | | |
|---|---|---|
| 376,547 A | 1/1888 | Pratt |
| 3,268,839 A | 8/1966 | McFarland |
| 2,949,880 A | 8/1969 | Stephen |
| 3,878,496 A | 4/1975 | Erickson |
| 4,229,733 A | 10/1980 | Tulenko et al. |
| 4,255,665 A | 3/1981 | Shriner |
| 4,348,664 A | 9/1982 | Boschetti et al. |

(Continued)

FOREIGN PATENT DOCUMENTS

| | | |
|---|---|---|
| AU | 2014100820 A4 | 8/2014 |
| JP | 201122101 A | 11/2011 |

(Continued)

OTHER PUBLICATIONS

Allaart et al.; An empirical model to predics the UV-index based on solar senith angles and total ozone; Meteorol. Appl,; (11)1; pp. 59-65; Mar. 2004.

(Continued)

*Primary Examiner* — Mark R Gaworecki
(74) *Attorney, Agent, or Firm* — Shay Glenn LLP; Thomas M. Zlogar

(57) ABSTRACT

Methods of accurately estimating erythemaly-weighted UV exposure, such as the UV Index, and sensors adapted for the same.

7 Claims, 16 Drawing Sheets

(56) References Cited

U.S. PATENT DOCUMENTS

| | | |
|---|---|---|
| 4,428,050 A | 1/1984 | Pellegrino et al. |
| D285,931 S | 9/1986 | May et al. |
| D286,298 S | 10/1986 | May et al. |
| 4,704,535 A | 11/1987 | Leber et al. |
| 4,726,688 A | 2/1988 | Ruel |
| 4,851,686 A | 7/1989 | Pearson |
| 5,008,548 A | 4/1991 | Gat |
| 5,036,311 A | 7/1991 | Moran et al. |
| 5,148,023 A | 9/1992 | Hayashi et al. |
| 5,151,600 A | 9/1992 | Black |
| 5,204,532 A | 4/1993 | Rosenthal |
| 5,365,068 A | 11/1994 | Dickerson |
| 5,382,799 A | 1/1995 | May |
| 5,497,004 A | 3/1996 | Rudolph et al. |
| 5,500,532 A | 3/1996 | Kozicki |
| 5,731,589 A | 3/1998 | Sief et al. |
| 5,777,733 A | 7/1998 | Radziuk |
| 5,992,996 A | 11/1999 | Sawyer |
| 6,201,250 B1 | 3/2001 | Morlock |
| 6,322,503 B1 | 11/2001 | Sparhawk |
| 6,426,503 B1 | 7/2002 | Wüest |
| 6,437,346 B1 | 8/2002 | Goudjil |
| 6,439,763 B2 | 8/2002 | Roeder et al. |
| 6,568,805 B1 | 5/2003 | Dietz et al. |
| 6,582,380 B2 | 6/2003 | Kazlausky et al. |
| D479,805 S | 9/2003 | Tsai |
| 6,729,756 B2 | 5/2004 | Sezai |
| 6,967,447 B2 | 11/2005 | Lim et al. |
| D526,220 S | 8/2006 | Wildey et al. |
| 7,148,489 B2 | 12/2006 | Yagi |
| 7,227,153 B2 | 6/2007 | Yagi |
| 7,230,222 B2 | 6/2007 | Cheng et al. |
| 7,265,358 B2 | 9/2007 | Fontaine |
| 7,500,746 B1 | 3/2009 | Howell et al. |
| 7,635,906 B2 | 12/2009 | Nakamura et al. |
| 7,709,812 B2 | 5/2010 | Simon et al. |
| 7,874,666 B2 | 1/2011 | Xu et al. |
| 8,044,363 B2 | 10/2011 | Ales et al. |
| 8,109,629 B2 | 2/2012 | Howell et al. |
| 8,157,730 B2 | 4/2012 | LeBoeuf et al. |
| 8,434,863 B2 | 5/2013 | Howell et al. |
| 8,487,267 B2 | 7/2013 | Abe et al. |
| 8,558,155 B2 | 10/2013 | Tomlinson et al. |
| 8,586,938 B2 | 11/2013 | Tsubata et al. |
| 8,605,802 B2 | 12/2013 | Lee et al. |
| 8,608,273 B2 | 12/2013 | Ezawa et al. |
| 8,829,457 B2 | 9/2014 | Smith et al. |
| 9,068,887 B1 | 6/2015 | Bennouri et al. |
| 9,360,364 B2 | 6/2016 | Hingorani et al. |
| 9,368,537 B1 | 6/2016 | Holmes et al. |
| 9,798,458 B2 | 10/2017 | Dumont et al. |
| 9,880,052 B2 | 1/2018 | Dumont et al. |
| 9,880,725 B2 | 1/2018 | Dumont et al. |
| D829,112 S | 9/2018 | Dumont et al. |
| 10,113,903 B1 | 10/2018 | Patil et al. |
| 10,132,680 B1 | 11/2018 | Isikman et al. |
| 10,145,732 B1 | 12/2018 | Gibson |
| 10,378,953 B2 | 8/2019 | Dumont et al. |
| 10,527,490 B2 | 1/2020 | Dumont et al. |
| 10,527,491 B2 | 1/2020 | Dumont et al. |
| 10,732,034 B2 | 8/2020 | Dumont et al. |
| 10,739,253 B2 | 8/2020 | Dumont et al. |
| 10,876,886 B2 * | 12/2020 | Dumont .................. G01J 1/08 |
| 2002/0130622 A1 | 9/2002 | Chen et al. |
| 2003/0150998 A1 | 8/2003 | Shin et al. |
| 2004/0021087 A1 | 2/2004 | Tokhtuve et al. |
| 2004/0108448 A1 | 6/2004 | Bosser |
| 2004/0149921 A1 | 8/2004 | Smyk |
| 2004/0225530 A1 | 11/2004 | Beil et al. |
| 2005/0167580 A1 | 8/2005 | Scott et al. |
| 2005/0190655 A1 | 9/2005 | Blumberg |
| 2005/0226446 A1 | 10/2005 | Luo et al. |
| 2006/0289779 A1 | 12/2006 | Marmaropoulos |
| 2007/0073487 A1 | 3/2007 | Albright et al. |
| 2007/0108389 A1 | 5/2007 | Makela et al. |
| 2007/0170366 A1 | 7/2007 | Lin et al. |
| 2008/0103561 A1 | 5/2008 | Moscovici |
| 2008/0217611 A1 | 9/2008 | Nakamura et al. |
| 2008/0266563 A1 | 10/2008 | Redman et al. |
| 2009/0090865 A1 | 4/2009 | Lub et al. |
| 2009/0296533 A1 | 12/2009 | Kojima |
| 2010/0163750 A1 | 7/2010 | Hunwick, III et al. |
| 2010/0173865 A1 | 7/2010 | Klostergaard et al. |
| 2010/0308105 A1 | 12/2010 | Savarese et al. |
| 2011/0133103 A1 | 6/2011 | Folkesson |
| 2011/0190595 A1 | 8/2011 | Bennett et al. |
| 2011/0191272 A1 | 8/2011 | McGuire |
| 2012/0115512 A1 | 5/2012 | Grainger et al. |
| 2012/0241618 A1 | 9/2012 | Hsu et al. |
| 2012/0326046 A1 | 12/2012 | Aslam et al. |
| 2013/0020477 A1 | 1/2013 | Castellan et al. |
| 2013/0048879 A1 | 2/2013 | Clark |
| 2013/0093322 A1 | 4/2013 | Borsuk et al. |
| 2013/0096466 A1 | 4/2013 | Sarrafzadeh et al. |
| 2014/0032165 A1 | 1/2014 | Sarrafzadeh et al. |
| 2014/0092238 A1 | 4/2014 | Sandhu et al. |
| 2014/0145860 A1 | 5/2014 | Park et al. |
| 2014/0266594 A1 | 9/2014 | Reiser |
| 2014/0275884 A1 | 9/2014 | Lin |
| 2014/0296658 A1 | 10/2014 | Yuen et al. |
| 2014/0374600 A1 | 12/2014 | Gokingco et al. |
| 2015/0041663 A1 | 2/2015 | Oliver et al. |
| 2015/0102208 A1 | 4/2015 | Appelboom et al. |
| 2015/0136975 A1 | 5/2015 | Sugaya et al. |
| 2015/0168365 A1 | 6/2015 | Conner |
| 2015/0177055 A1 | 6/2015 | Lian et al. |
| 2015/0177056 A1 | 6/2015 | Lian et al. |
| 2015/0177057 A1 | 6/2015 | Lian et al. |
| 2015/0177058 A1 | 6/2015 | Lian et al. |
| 2015/0177059 A1 | 6/2015 | Lian et al. |
| 2015/0177063 A1 | 6/2015 | Lian et al. |
| 2015/0238774 A1 | 8/2015 | Anderson et al. |
| 2015/0294080 A1 | 10/2015 | Garnavi et al. |
| 2015/0346025 A1 | 12/2015 | Spinella et al. |
| 2015/0347625 A1 | 12/2015 | Werneck et al. |
| 2016/0109959 A1 | 4/2016 | Heo |
| 2017/0225006 A1 | 8/2017 | Anderson et al. |
| 2017/0268928 A1 | 9/2017 | Chow et al. |
| 2018/0080818 A1 | 3/2018 | Tiwari et al. |
| 2018/0172506 A1 | 6/2018 | Park et al. |
| 2018/0224326 A1 | 8/2018 | Dumont et al. |
| 2018/0249944 A1 | 9/2018 | Poutiatine et al. |
| 2018/0306639 A1 | 10/2018 | Mehrl |
| 2020/0124468 A1 | 4/2020 | Dumont et al. |

FOREIGN PATENT DOCUMENTS

| | | |
|---|---|---|
| WO | WO01/52736 A1 | 7/2001 |
| WO | WO2005/103923 A2 | 11/2005 |
| WO | WO2011/094742 A2 | 8/2011 |
| WO | WO2013/034288 A1 | 3/2013 |
| WO | WO2013/106653 A1 | 7/2013 |
| WO | WO2014/102629 A1 | 7/2014 |

OTHER PUBLICATIONS amazon.com; UV meter (search results); 5 pgs.; retrieved from the internet (https://www.amazon.com/s/ref=nb_sb_noss_1?url=search-alias%3Daps&field-keywords=uv+meter) on Dec. 9, 2014.

Amini et al.; A wireless embedded device for personalized ultraviolet monitoring: Biodevices; 9; pp. 200-205; (year of pub. sufficiently earlier than effective US filing date and any foreign priority date) 2009.

Banerjee et al.; A comparative study of wearable ultraviolet radiometers; IEEE Life Sciences Conference; pp. 9-12; Dec. 13, 2017.

Bharatula et al.; Towards wearable autonomous microsystems; Pervasive Computing: Proceedings of the 2nd Int'l Conference; pp. 225-237; Vienna, Austria; Apr. 18-23, 2004.

Blumthaler: UV Monitoring for Public Health. Int J Environ Res Public Health; 15(8); 1723; Aug. 11, 2018; doi: 10.3390/ijerph15081723.

(56) References Cited

OTHER PUBLICATIONS

CDC; Sunburn prevalence among adults—United States 1991, 2003 and 2004; MMWR Weekly; 56(21); pp. 524-528; (9 pgs. printed); Jun. 1, 2007.

Chang et al.; Sun exposure and melanoma risk at different latitudes: a pooled analysis of 5700 cases and 7216 controls; Int J Epidemiol.; 38(3); pp. 814-830; Jun. 2009.

Chiche et al.; Seasonal variations of systemic lupus erythematosus flares in southern France; Eur. J. Intern. Med.; 23(3); pp. 250-254; Apr. 2012.

Corral et al; Bright light therapy's effect on postrpartum depression; Am J Psychiatry; 157(2); pp. 303-304; Feb. 2000.

Corrêa, et al.; Comparison between UV index measurements performed by research-grade and consumer-products instrucments; Photochem. Photobiol. Sci.; 9; pp. 459-463; online: Mar. 19, 2010.

Cortes et al.; Support-vector networks; Machine Learning; 20(3); pp. 273-297; Sep. 1995.

Dennis et al.; Sunburns and risk of cutaneous melanoma: does age matter? A comprehensive meta-analysis; Ann Epidemiol; 18(8); pp. 614-627 (author manuscript, 25 pgs printed); Aug. 2008.

Diffey et al.; The standard erythema dose: a new photobiological concept; Journal of Photodermatology, Photoimmunology & Photomedicine; 13(1-2); pp. 64-66; Feb./Apr. 1997.

Environmental Protection Agency; Ultraviolet and Ozone Monitoring Program (program information); retrieved Oct. 24, 2016 from the internet archive: (http://web.archive.org/web/20080516110808/http://www.epa.gov/uvnet/); last updated: Jan./Feb. 2008.

Fahrni et al.; Sundroid: Solar Radiation Awareness with Smartphones; Proceedings of the 13th Int'l. Conf. on Ubiquitous Computing (UbiComp '11); Beijing, China; pp. 365-374; Sep. 17-21, 2011.

Ferguson et al.; Voluntary exposure of some western-hemisphere snake and lizard species to ultraviolet-B radiation in the field: How much ultraviolet-B should a lizard or snake receive in captivity?; Zoo Biol; 29(3); pp. 317-334; May/Jun. 2010.

Gerd Neumann Jr.; Deep-Black Optical Paint (product page); 1 pg.; retrieved from the internet: (http://www.gerdneumann.net/english/instrument-building-parts-teile-fuer-den-fernrohrbau/totmatte-schwarze-optikfarbe-deep-black-optical-paint.html) on Oct. 24, 2016.

Hartigan et al.; Algorithm AS 136: A K-Means Clustering Algorithm; Journal of the Royal Statistical Society. Series C (Applied Statistics); 28(1); pp. 100-108; (year of pub. sufficiently earlier than effective US filing date and any foreign priority date) 1979.

Hartigan, John A.; Clustering Algorithms; John Wiley & Sons, Inc.; pp. 84-99; Apr. 1975.

Heckman et al.; Minimal erythema dose (MED) testing; J. Vis. Exp.; 75; e50175 5 pgs.; May 2013.

Heydenreich et al.; Miniature personal electronic UVR dosimeter with erythema response and time-stamped reading in a wristwatch; Photochem Photobiol.; 81(5); pp. 1138-1144; Sep./Oct. 2005.

Horsley et al.; Current action for skin cancer risk reduction in English schools: pupils' behaviour in relation to sunburn; Health Educ Res.; 17(6); pp. 715-731; Dec. 2002.

Indiegogo; SunFriend UV Daily Activity Monitor (product information); 8 pgs.; retrieved from the internet (https://www.indiegogo.com/projects/sunfriend-uv-daily-activity-monitor) on Oct. 19, 2016.

Klein et al.; Analysis of compact fluorescent lights for use by patients with photosensitive conditions; Photochem Photobiol; 85(4); pp. 1004-1010; (15 pgs., author manuscript version); Jul./Aug. 2009.

Larason et al.; Sources of error in UV radiation measurements; J. Res. Natl. Inst. Stand. Technol.; 106(4); pp. 649-656; Jul./Aug. 2001.

Lindgren et al.; Measuring effective vitamin D3-producing ultravioloet B radiation using Solartech's Solarmeter 6.4 Handheld, UVB radiometer®; Bull. Chicago Herp. Soc.; 43(4); pp. 57-62; (year of pub. sufficiently earlier than effective US filing date and any foreign priority date) 2008.

Mackenzie; The analysis of the ultraviolet radiation doses required to produce erythemal responses in normal skin; Br. J. Dermatol.; 108(1); pp. 1-9; Jan. 1983.

McKinlay et al.; A reference action spectrum for ultra-violet induced erythema in human skin; CIE J.; 6(1); pp. 17-22; Mar. 1987.

Microsoft; Microsoft Band Official Site; Live healthier and be more productive (product information); 22 pgs.; retrieved from the internet (http://www.microsoft.com/microsoft-band/en-us) on Dec. 9, 2014.

NASA; Actillume (hardware information page); 1 pg.; retrieved from the internet: (https://lsda.jsc.nasa.gov/scripts/hardware/hardw.aspx?hardware_id=173) on Oct. 21, 2016.

Natatmo; Be Sun Savvy: JUNE by netatmo (product information); 6 pgs.; Jan. 5, 2014 (product date: 2011).

Oren et al.; An Open Trial of Morning Light Therapy for Treatment of Antepartum Depression; American Journal of Psychiatry; 159(4); pp. 666-669; Apr. 2002.

pveducation.org; Spectral Irradiance; 1 pg.; retrieved from the Internet: (http://www.pveducation.org/pvcdrom/2-properties-sunlight/spectral-irradiance); on Oct. 24, 2016.

Rabin; A portable glow to help melt those winter blues; New York Times (p. D5) 4 pgs.; Nov. 15, 2011.

Rensselaer, Lighting Research Center; Demesimeter—Light and Activity Measurement System Description and Calibration; 14 pgs.; Sep. 2, 2011 (rev. Nov. 15, 2011).

Rogers et al.; Prevalence and determinants of sunburn in Queensland; Health Promot J Austr.20(2); pp. 102-106; Aug. 2009.

Sayre et al.; Skin type, minimal erythema dose (MED), and sunlight acclimatization; Am. Acad. Dermatology; 5(4); pp. 439-443; Oct. 1981.

SBIR (STTR); Actillume—A monitor for activity and light exposure (research information); 2 pgs.; retrieved from the internet: (https://lsda.jsc.nasa.gov/scripts/hardware/hardw.aspx?hardware_id=173) on Oct. 21, 2016.

Schmalwieser et al.; A first approach in measuring, modeling and forecasting the vitamin D effective UV radiation; SPIE Proceedings; vol. 6362; Remote Sensing of Clouds and the Atmosphere XI, 63622C; Stockholm, Sweden; 9 pgs.; Sep. 11, 2006.

Solartech, Inc.; Radiometer UV Index: Model 6.5 (product information: SM/Sensors/Model 6.5 UV Index_Sep. 2015); 2 pgs.; retrieved from the internet (http://www.solarmeter.com/model65.html) on Oct. 19, 2016.

Solartech, Inc.; Solarmeter Model 5.0 UV Meter; 2 pgs.; retrieved from the internet (http://www.solarmeter.com/model5.html) on Oct. 19, 2016.

Solartech, Inc.; Solarmeter Model 6.5 UV Meter; 4 pgs.; retrieved from the internet (http://www.solarmeter.com/model65.html) on Oct. 19, 2016.

Staiger et al.; Global UV index Forecasting by the Deutscher Wetterdienst (DWD); pp. 1-5; (year of pub. sufficiently earlier than effective US filing date and any foreign priority date) 2008.

Sunsprite; Sunsprite Personal Light Tracker (product information); © 2016; 6 pgs.; retrieved from the internet (https://www.sunsprite.com/) on Oct. 19, 2016.

Thieden et al.; The wrist is a reliable body site for personal dosimetry of ultraviolet radiation; Journal of Photodermatology, Photoimmunology & Photomedicine; 16(2); pp. 57-61; Apr. 2000.

Weichenthal et al.; Phototherapy: how does UV work?; Photodermatol Photoimmunol Photomed.; 21(5); pp. 260-266; Oct. 2005.

Wikipedia; Bluetooth low energy; 11 pgs.; retrieved from the internet (https://en.wikipedia.org/wiki/Bluetooth_low_energy) on Oct. 21, 2016.

Wikipedia; Diffuser (optics); 2 pgs.; retrieved from the internet (https://en.wikipedia.org/wiki/Diffuser_(optics)) on Oct. 21, 2016.

Wikipedia; Lambert's cosine law; 4 pgs.; retrieved from the internet (https://en.wikipedia.org/wiki/Lambert's_cosine_law) on Oct. 21, 2016.

Wikipedia; Norm (mathetics): 3.2 Euclidean norm (definition); 10 pgs.; retrieved from the Internet: (https://en.widipedia.org/wiki/Norm_(mathematics)#Euclidean_norm) on Oct. 24, 2016.

Wikipedia; Solar zenith angle; 2 pgs.; retrieved from the internet (https://en.wikipedia.org/wiki/Solar_zenith_angle) on Oct. 21, 2016.

(56) References Cited

OTHER PUBLICATIONS

Wirz-Justice; A randomized, double-blind, placebo-controlled study of light therapy for antepartum depression; J Clin Psychiatry; 72(7); pp. 986-993; Jul. 2011.
Xu et al.; Characterization and calibration of broadband ultraviolet radiometers; Metrologia; 37(3); pp. 235-242; Jun. 2000.
Zayat et al.; Preventing UV-light damage of light sensitive materials using a highly protective UV-absorbing coating; Chem Soc Rev.; 36(8); pp. 1270-1281; Aug. 2007.

* cited by examiner

| Sensor | Accuracy at 1% tolerance |
|--------|--------------------------|
| D33    | .79                      |
| D53    | .79                      |
| H      | .76                      |
| O1     | .76                      |
| O2     | .79                      |
| V0     | .78                      |
| V5a    | .78                      |
| V5b    | .78                      |
| S      | .82                      |

Figure 12

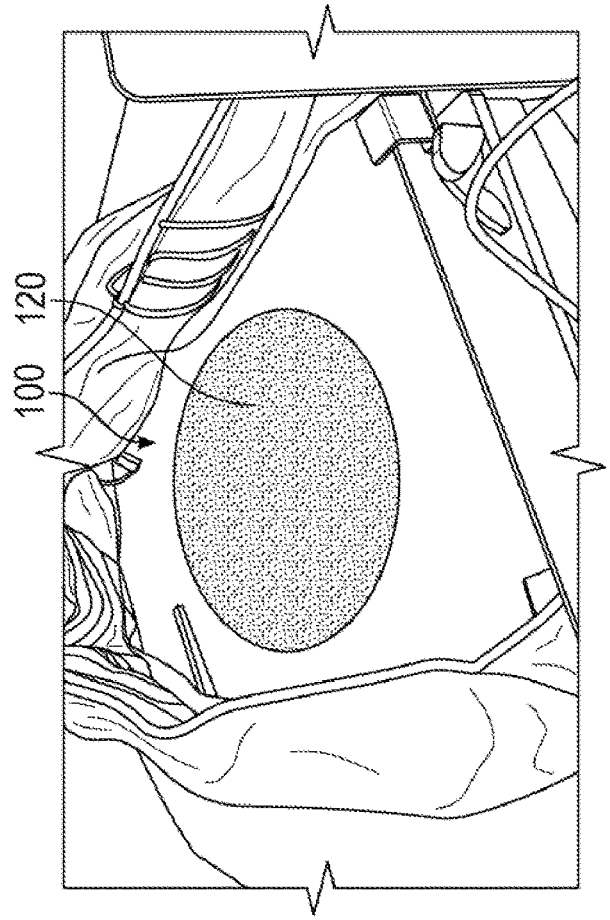

FIG. 15

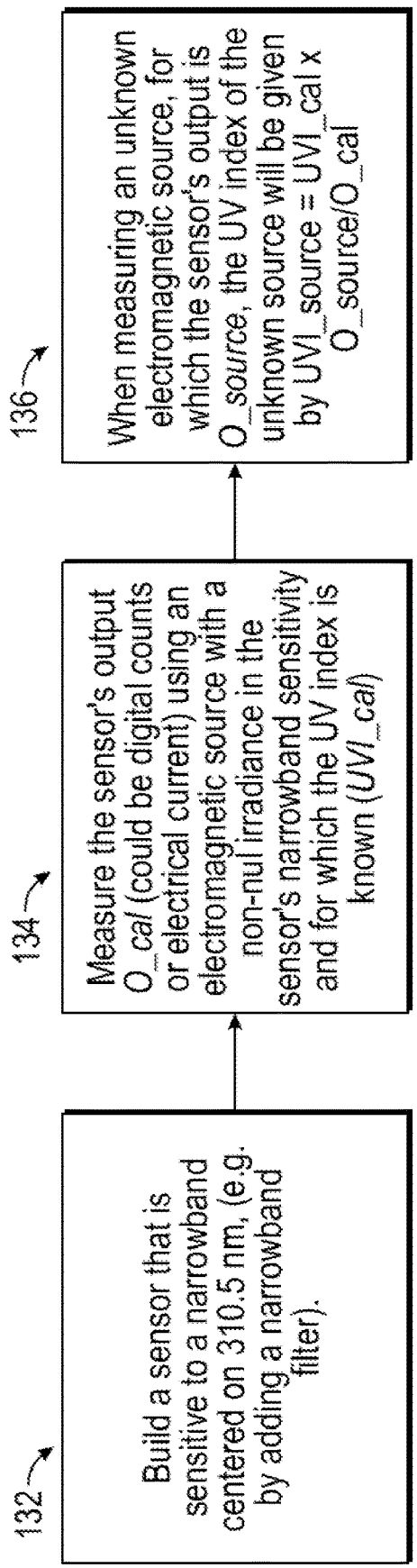

132 → Build a sensor that is sensitive to a narrowband centered on 310.5 nm, (e.g. by adding a narrowband filter).

134 → Measure the sensor's output O_cal (could be digital counts or electrical current) using an electromagnetic source with a non-null irradiance in the sensor's narrowband sensitivity and for which the UV index is known (UVI_cal).

136 → When measuring an unknown electromagnetic source, for which the sensor's output is O_source, the UV index of the unknown source will be given by UVI_source = UVI_cal × O_source/O_cal

FIG. 16

METHODS, SYSTEMS, AND APPARATUSES FOR ACCURATE MEASUREMENT OF HEALTH RELEVANT UV EXPOSURE FROM SUNLIGHT

CROSS REFERENCE TO RELATED APPLICATIONS

This application is a continuation of U.S. application Ser. No. 16/659,427, filed Oct. 21, 2019, which claims the benefit of priority of U.S. Application No. 62/748,233, filed Oct. 19, 2018, each of which is incorporated by reference herein in its entirety for all purposes.

The disclosures of US. Pub. No. 2017/0115162 and U.S. Pub. No. 2016/0364131 are fully incorporated by reference herein for all purposes.

STATEMENT REGARDING FEDERALLY SPONSORED RESEARCH

This invention was made with government support under award number 1746461 awarded by the National Science Foundation The government has certain rights in the invention.

INCORPORATION BY REFERENCE

All publications and patent applications mentioned in this specification are herein incorporated by reference to the same extent as if each individual publication or patent application was specifically and individually indicated to be incorporated by reference.

BACKGROUND

Ultraviolet (UV) is radiation with a wavelength from 10 nm to 400 nm. UV from sunlight that reaches the surface of the Earth has a wavelength between 280 nm to 400 nm. UV radiation with a wavelength from 280 nm to 315 nm is called "UVB" and UV radiation with a wavelength from 315 to 400 nm is called "UVA".

UV exposure is known to have short-term and long-term impacts on health. Short-term impacts include, for instance, sunburns. Long-term impacts include, for instance, skin cancer. Melanoma of the skin is the 6th most important cancer by incidence rate and 90% of them are caused by excessive UV exposure, according to the CDC. In 1987, Diffey and McKinley published an article that quantifies the sensitivity of the human skin to UV radiation and they discovered that the human skin is exponentially more sensitive to UVB than to UVA. They called this sensitivity "erythema spectrum" and we will refer to it as the erythema action spectrum EAS, and is shown in FIG. 1. This spectral sensitivity has been adopted for health relevant UV measurements by the World Health Organization (WHO), International Standards Organization (ISO17166) and CIE. Other health-relevant sensitivity spectra (also called "weighting functions") have been defined. For instance, the "Vitamin D Action Spectrum" (http://www.cie.co.at/publications/action-spectrum-production-previtamin-d3-human-skin) looks at the production of vitamin D3 as a function of the wavelength in the UV range. The Vitamin D Action Spectrum is similar to erythemaly-weighted UV for wavelengths more than 300 nm, which is the most part of most sun spectra. The purpose of these health-relevant sensitivity spectra in the UV range are designed to measure what we call here "UV exposure for health", i.e. to provide a measurement of UV exposure that has a meaning for health. It is to be noted that these sensitivity spectra are quite similar to each other in the range of 300 nm to 400 nm, which makes most of the radiance in solar spectra. Therefore, the inventive concepts herein, including the methods, are applicable to all health-relevant ways of measuring UV exposure from sunlight.

There are several units when measuring sun exposure for health. A general equation is the following:

$$U = \int_{280}^{400} S(\lambda)E(\lambda)d\lambda$$

Where $\lambda$ is the wavelength, $E(\lambda)$ is the wavelength-dependent UV-relevant weighting function (e.g. erythema action spectrum) and $S(\lambda)$ is the spectral irradiance of a given UV spectrum. $S(\lambda)$ is usually expressed in W/m2/nm. U is the integration of these two functions over the UV spectrum (280-400 nm) and is usually expressed in W/m2. When $E(\lambda)$ is the erythema action spectrum, and U is normalized by 25 mW/m2, one obtains the "UV index". The UV index was adopted by the World Health Organization and several government agencies (e.g. the EPA in the US) to educate people on the danger of UV exposure. Universal recommendations are based on the value of the UV index. For instance, if the UV index is below 2, the WHO estimates that it safe to be outside. FIG. 2 illustrates WHO Recommendations based on the UV index, obtained from http://www.who.int/uv/intersunprogramme/activities/uv_index/en/index1.html. It is worth noting that U is an "instantaneous" quantification of UV exposure. If one is interested in the impact of UV exposure over time (e.g. a period of time called $\Delta t$), one should integrate over time:

$$D = \int_{\Delta t} \int_{280}^{400} S(\lambda)E(\lambda)d\lambda dt$$

D would usually be called "radiant exposure" and usually be expressed in J/m2 or in a unitless quantity if it is normalized by a reference value (e.g. the "Standard Erythema Dose" which amounts to 100 J/m2 of erythemal effective radiant exposure, as explained by Diffey in "Sources and measurement of ultraviolet radiation", Academic Press, 2002). Similarly, the quantities U and D can be integrated over a surface (e.g. the surface of the skin) to obtain a quantity in Watts and Joules respectively. The inventive concepts herein (e.g. methods and/or sensors) can be used to predict all these quantities that relate to a health-relevant function such as the erythema action spectrum or the Vitamin D action spectrum. When UV Index is estimated herein, it is thus understood to be illustrative, and not limiting to the different uses of the innovative concepts herein.

Because sunlight presents an ever-changing spectrum as a function of time of day, location, pollution, etc., existing detectors aiming at measuring the UV index must accurately weight each wavelength according to the EAS and be properly calibrated against a known UV source. Otherwise, they will be extremely inaccurate as shown by Correa et al. and later by Banerjee and colleagues. FIG. 3 illustrates measured UV spectral irradiance at the same time from 3 different locations. FIG. 4 illustrates a comparison of commercially-available personal UV sensors when measuring the UV index from sunlight, adapted from Banerjee et al. (Banerjee, S., Hoch, E. G., Kaplan, P. D. & Dumont, E. L. P. A comparative study of wearable ultraviolet radiometers. in 2017 *IEEE Life Sciences Conference* (LSC) 9-12 (2017)).

The spectral sensitivity of UV sensors (which may also be called UV photodetectors or UV detectors, or simply sensors, herein) results from the combination of the semiconductor (e.g. silicon carbide) and any optics, such as filters, on top of it as well as, sometimes, additional electronics components (such as analog-to-digital converters). UV sensors generally include a semiconductor made of silicon carbide, gallium nitride, or aluminum gallium nitride (these are called "compound" semiconductors because they are made of chemical elements of at least 2 different species). Therefore, for some systems, a significant challenge of building a system to measure the UV index is to find a combination of an optical filter with a photodetector chemistry (semiconductor) to closely match the EAS. FIG. 5 illustrates the basic architecture of an exemplary UV sensor.

Previous attempts to develop UV sensors tend to either assume that the spectral sensitivity of the sensor is relatively unimportant, or to try to match the sensitivity of the EAS.

SUMMARY OF THE DISCLOSURE

One aspect of this disclosure is a computer executable method of estimating erythemaly-weighted UV exposure, the computer executable method stored in a memory, the method comprising: receiving as input information that is indicative of an irradiance measured from a sensor sensitive to incident light having a spectral sensitivity from 305 nm-315 nm; and estimating erythemaly-weighted UV exposure (e.g., the UV index) using the input information.

Estimating erythemaly-weighted UV exposure can comprise utilizing a relationship that can be approximated to a linear correlation between the information and the UV Index.

The receiving step can comprise receiving as input information that is indicative of an irradiance measured from a sensor sensitive to incident light having a spectral sensitivity from 308 nm-312 nm.

The receiving step can comprise receiving as input information that is indicative of an irradiance measured from a sensor sensitive to incident light having a spectral sensitivity from 309.5 nm-311.5 nm.

The erythemaly-weighted UV exposure can be the UV Index, and it can be a product of a calibration UV index of a known calibration source and a ratio of the output of the sensor when exposed to the unknown electromagnetic source to an output of the sensor when exposed to the calibration source.

The receiving step can include receiving as input information that is indicative of an irradiance measured from a sensor that includes a narrow-band filter disposed above a semiconductor.

The method can also include causing to be displayed on a display (e.g., on a display of a smartphone) the estimated erythemaly-weighted UV exposure (e.g., UV Index).

The method can also include causing the estimated erythemaly-weighted UV exposure (e.g., UV Index) to be input to a method (e.g., computer executable method) that determines how much time a person may safely spend outdoors.

One aspect of the disclosure is a method of using a sensor adapted for use in estimating erythemaly-weighted UV exposure, comprising: measuring irradiance from a sensor that is sensitive to incident light and that has a spectral sensitivity from 305 nm-315 nm; and estimating erythemaly-weighted UV exposure using the measured irradiance.

The measuring step can comprise measuring irradiance from a sensor that has narrow-band filter disposed above a semiconductor.

Estimating erythemaly-weighted UV exposure can comprise receiving as input information that is indicative of the measured irradiance.

Estimating erythemaly-weighted UV exposure can be performed by a computer executable method stored in a memory.

Estimating erythemaly-weighted UV exposure can comprise utilizing a relationship that can be approximated to a linear correlation between the information and the UV Index.

Estimating erythemaly-weighted UV exposure can comprise calculating a product of a calibration UV index of a known calibration source and a ratio of an output of the sensor when exposed to the unknown electromagnetic source to an output of the sensor when exposed to the calibration source.

The measuring step can comprise measuring irradiance from a sensor that is sensitive to incident light and that has a spectral sensitivity from 308 nm-312 nm.

The measuring step can comprise measuring irradiance from a sensor that is sensitive to incident light and that has a spectral sensitivity from 309.5 nm-311.5 nm.

The measuring step can comprise measuring a current from the sensor.

The measuring step can comprise measuring a number of counts from the sensor.

One aspect of this disclosure is a sensor adapted for use in estimating erythemaly-weighted UV exposure: wherein the sensor is more sensitive to light with a wavelength from 305 nm to 315 nm than to light with a wavelength outside of 305 nm to 315 nm.

The sensor can comprise a semiconductor and an optic portion, and wherein the combination of the semiconductor and the optic portion may make the sensor more sensitive to light with a wavelength from 305 nm to 315 nm than to light with a wavelength outside of 305 nm to 315 nm.

The sensor can comprise a semiconductor that is sensitive to at least one of the wavelengths between 309 nm and 312 nm.

The sensor may be more sensitive to light with a wavelength from 308 nm to 312 nm than to light with a wavelength outside of 308 nm to 312 nm.

The sensor may further include a sensor output detector that is adapted to detect an output from the sensor.

The sensor may include a narrow-band filter disposed above a semiconductor. A combination of the narrow-band filter and the semiconductor can make the sensor more sensitive to light with a wavelength from 305 nm to 315 nm than to light with a wavelength outside of 305 nm to 315 nm. The narrow-band filter may be centered on 312 nm. The semiconductor may be a silicon carbide semiconductor.

The sensor may be disposed in a wearable device. The wearable device may further comprise a UVA sensor.

The sensor may be disposed in a personal device (e.g., smartphone). The personal device may have a display and may be configured with control circuity to display the estimated erythemaly-weighted UV exposure (e.g., UV Index).

One aspect of the disclosure is system for calculating an estimated UV Index, and can include any of the sensors herein, and any of the executable methods herein. The system may include a sensor adapted for use in estimating erythemaly-weighted UV exposure, wherein the sensor is more sensitive to light with a wavelength from 305 nm to 315 nm than to light with a wavelength outside of 305 nm to 315 nm. The system may include a computer executable method stored in a memory, the computer executable method adapted to: receive as input information that is indicative of an irradiance measured from the sensor, and estimate erythemaly-weighted UV exposure using the input information.

One aspect of the disclosure is a UV sensor that is sensitive to incident UV light, a first environment (E1) that includes unfiltered sunlight and a second environment (E2) that includes one of a first, second, and third notch filters having transmission centers at 300 nm, 310 nm, and 320 nm, respectively, wherein when the sensor is exposed to E1, and E2 with each of the three filters, a sensitivity of the sensor (S) is characterized as a percent change in an output of the sensor between E1 and E2 with each of the three notch filters, the sensor thereby having a S300, a S310, and a S320, and wherein a relative "$R_{310}$ minus" sensitivity of the sensor is characterized by S310/S300 and wherein a relative "$R_{310}$ plus" sensitivity of the sensor is characterized by S310/S320, and wherein at least one of $R_{310}$ minus and $R_{310}$ plus is greater than 15.

The sensor can include a narrow-band filter above a semiconductor.

The sensor may be more sensitive to light with a wavelength from 305 nm to 315 nm than to light with a wavelength outside of 305 nm to 315 nm.

The sensor may comprise a semiconductor and an optic portion, and wherein the combination of the semiconductor and the optic portion makes the sensor more sensitive to light with a wavelength from 305 nm to 315 nm than to light with a wavelength outside of 305 nm to 315 nm.

The sensor may comprise a semiconductor that is sensitive to at least one of the wavelengths between 309 nm and 312 nm.

The sensor can be more sensitive to light with a wavelength from 308 nm to 312 nm than to light with a wavelength outside of 308 nm to 312 nm.

The sensor may further include a sensor output detector that is adapted to detect an output from the sensor.

The sensor may further include a personal device (e.g., smartphone) in which the sensor is disposed and secured. The personal device may have a display.

BRIEF DESCRIPTION OF THE DRAWINGS

FIG. 12 shows the illustrative sensors from FIG. 11 and the accuracy at 1% tolerance.

FIG. 15 shows the device from FIG. 14, and includes an optional diffuser over internal components.

FIG. 16 illustrates an exemplary method of use.

DETAILED DESCRIPTION

Figure 1:
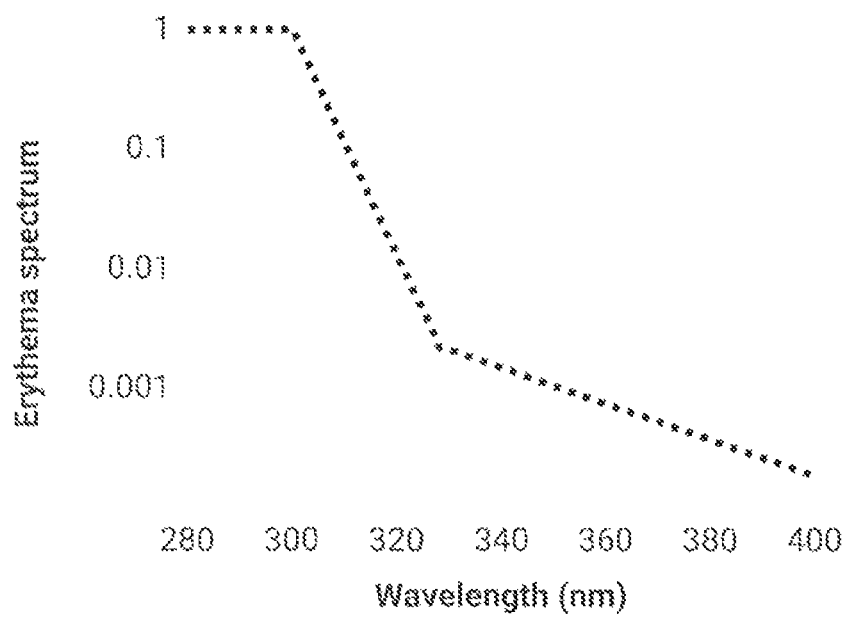
FIG. 1 shows the erythema action spectrum EAS.

Erythemaly-weighted UV exposure (e.g., UV Index) is used to provide a wide variety of information to people. For example, the UV index can provide a general indication about how much time an individual may want to spend exposed to sunlight, or it may help make a decision about whether or not to apply sunscreen. The UV index is used and useful for a wide variety of purposes.

This disclosure describes innovative and illustrative UV sensors that are adapted to accurately estimate erythemaly-weighted UV exposure (including the UV index) and other health-relevant weighting functions (e.g. Vitamin D Action Spectrum) from sunlight at the earth's surface. This disclosure also includes innovative methods of estimating erythemaly-weighted UV exposure, including the UV Index, regardless of the particular light sensor that is used. The disclosure also includes methods of manufacturing UV sensors, as well as methods of modifying a large class of photodetectors and light sensors to accurately estimate the UV index.

Erythemaly-weighted UV exposure, as used herein, includes the UV index. When the "UV index" is used herein it is understood to be illustrative, and is understood that "erythemaly-weighted UV exposure" or "Vitamin D Action Spectrum" is also being described. UV exposure for health is a general term that includes erythemaly-weighted UV exposure. It can include other weighting functions such as the Vitamin D Action Spectrum (http://www.cie.co.at/publications/action-spectrum-production-previtamin-d3-human-skin). The Vitamin D Action Spectrum is similar to erythemaly-weighted UV for wavelengths more than 300 nm, which is the most part of most sun spectra.

It is understood that the light sensors herein are illustrative, and the methods of estimating UV index herein need not be performed using the light sensors herein.

Inventive and illustrative light sensors described herein are adapted and configured to measure the UV index from the sun and are highly accurate, but are simpler to manufacture than sensors that attempt to replicate the EAS. The inventive light sensors herein were first validated by analyzing thousands of solar spectra from the EPA UVnet database (EPA, U. S., ORD, Human Exposure & Atmospheric Sciences. EPA UV NET Ultraviolet Monitoring Program. Available at: https://archive.epa.gov/uvnet/web/html/index.html. (Accessed: 5 Oct. 2018)).

Some UV sensors, in order to accurately estimate UV index, need to be recalibrated based on the day, time, and/or location of the UV sensor. This greatly increases the complexity of the sensor, on the hardware and/or software side. One of the surprising and non-obvious findings described in this disclosure is that an accurate UV Index can now be estimated using simpler methods and calculations. For example, this disclosure details the significant finding that UV index can be accurately and simply estimated using a much simpler sensor and/or much less processing of the output from a light sensor.

One of the significant findings and aspects of this disclosure is that the UV index can now be accurately estimated using much simpler methods and/or sensors regardless of the location of the sensor, and regardless of the time at which the sensor is exposed to the light source (e.g., sunlight). The ramifications of these findings are that the devices do not need to be recalibrated based on the day, time and/or location to accurately estimate UV index.

The inventive light sensors herein respond linearly to a narrow band of irradiance around 311 nm, including 310.5 nm. The surprising nature of the inventive light sensors herein is that this simple spectral sensitivity is predictive of the UV Index across all actual solar spectra. This means that this spectral sensitivity can be used to predict UV Index regardless of the day, time, and location where and when the light sensor is exposed to the solar spectra. While the basic methods are fundamental and do not depend on the particular sensor that is used, this finding was further validated by prototyping an illustrative narrow-band light sensor sensitive to only 311-313 nm. Specifically, a semiconductor chemistry sensitive to 250-380 nm (Silicon Carbide) was combined with a narrow-band filter centered on 312 nm (specifically, 311.25 nm-312.75 nm), as well as a diffuser on top of the system. This prototype was then validated against a state-of-the-art radiometer by measuring the UV index in a variety of solar spectra, which led to the unexpected and non-obvious finding that the prototype was more accurate than all known low-cost UV index sensors. This appears to be the first UV sensor capable of measuring the UV index correctly without exhibiting a spectral sensitivity similar to the EAS. Because this UV sensor is relatively very simple by design, it appears to be the first low-cost UV sensor capable of measuring the UV index with an accuracy comparable to laboratory-grade UV index sensors.

Figure 6A:
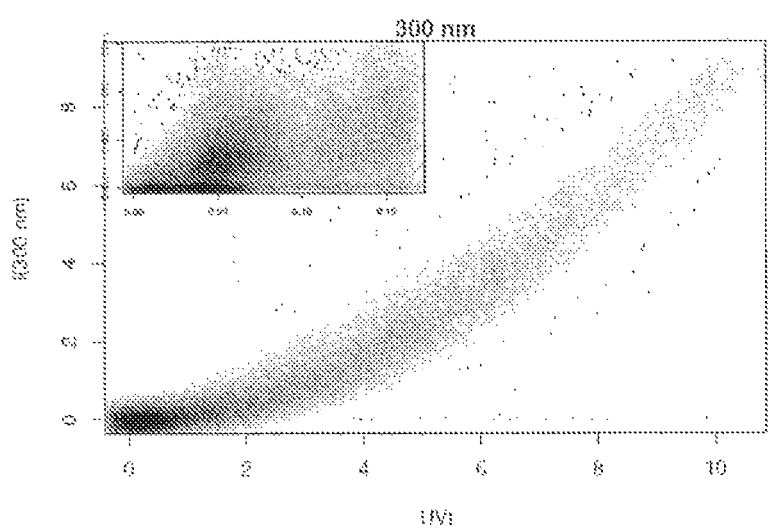
FIGS. 6A, 6B and 6C illustrate the linear fit of the irradiance at 300, 310, and 320 nm against the UV index for 73,000 solar spectra.
Figure 6B:
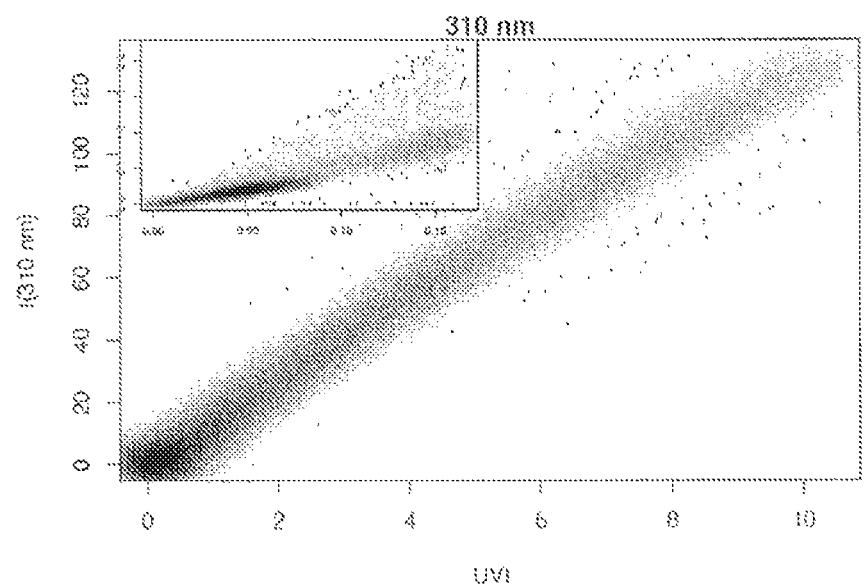
Figure 6C:
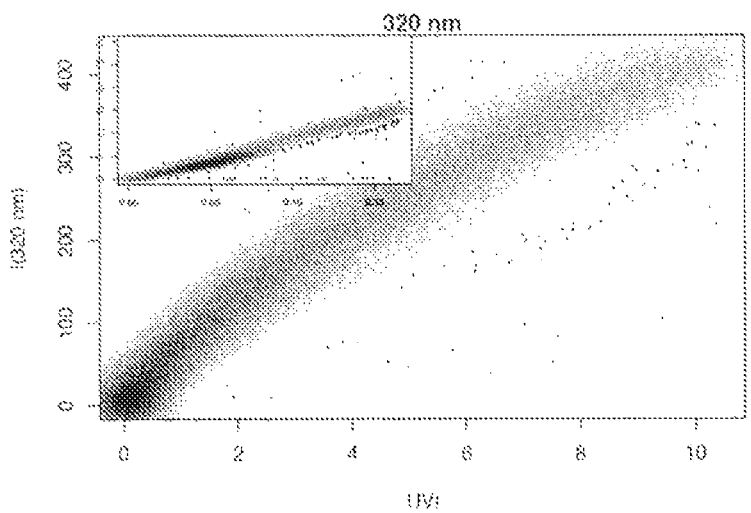

Theory. FIGS. 6A, 6B and 6C show how the accuracy of the single-wavelength prediction of the UV index over the 73,000 solar spectra found in the UVnet database. The methodology is the following: for each wavelength, a linear fit was applied between the 73,000 measurements of irradiance at that wavelength to the UV index of the corresponding solar spectrum. FIGS. 6A-6C shows the linear fit of the irradiance at 300, 310, and 320 nm against the UV index for the 73,000 solar spectra. As shown by comparing FIG. 6B with FIGS. 6A and 6C, the linear fit is much better for the wavelength 310 nm.

Figure 7A:
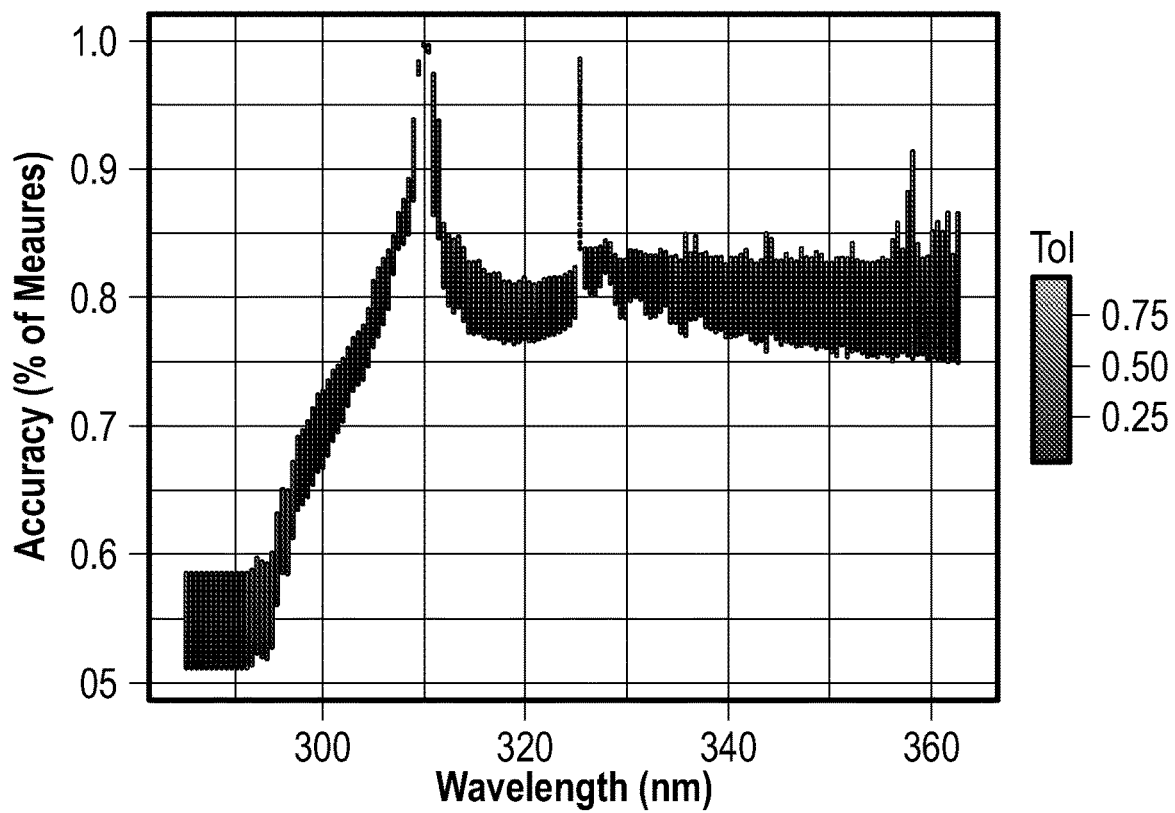
FIGS. 7A and 7B are plots showing how many estimates of the UV index fall between 1% and 90% of the actual UV index across 73,000 solar spectra.
Figure 7B:
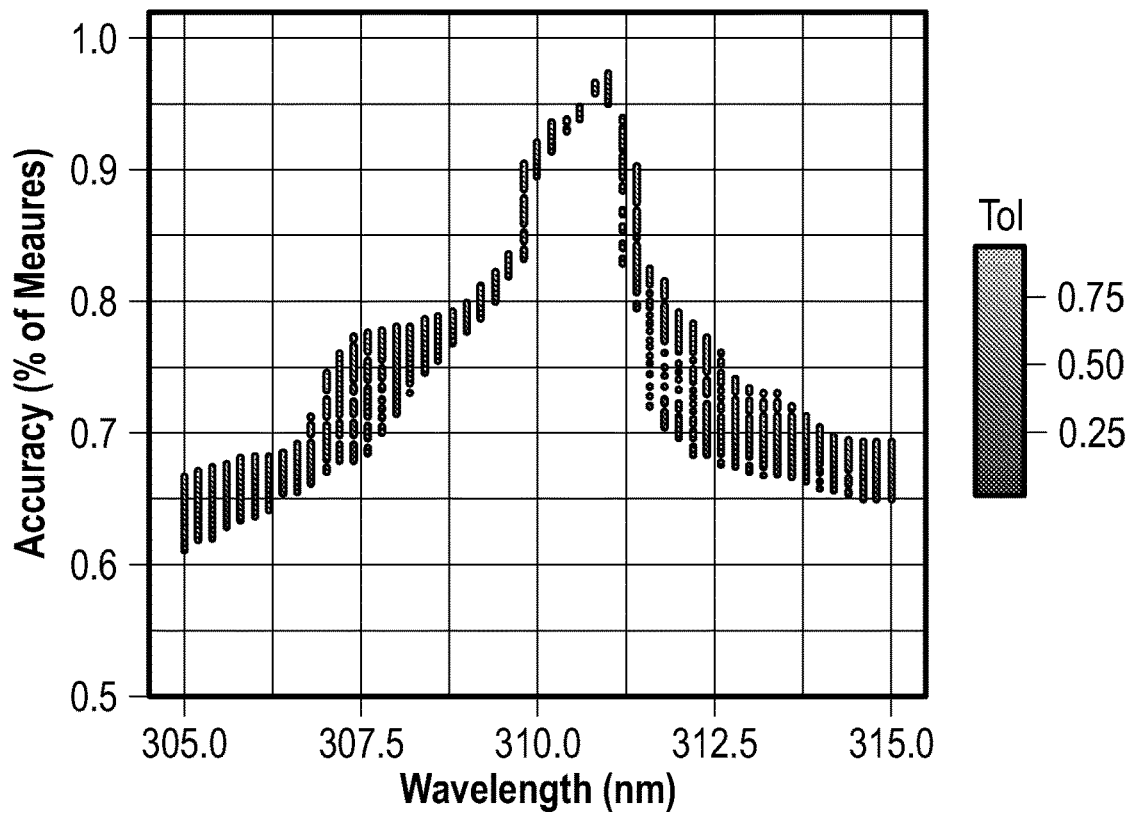

For each wavelength, a plot was created showing how many estimates of the UV index fall between 1% (in black in the figure) and 90% (in light blue in the figure) of the actual UV index (calculated by applying the EAS to the solar spectrum) across the 73,000 solar spectra. As shown by FIGS. 7A and 7B, there is a peak around 310.5 nm (310-312 nm) meaning that, for all these spectra, using the irradiance from 310 nm-312 nm, (e.g., at 310.5 nm) is predictive of the UV index of the corresponding spectrum. This means that measuring the irradiance at a very limited range of wavelengths, including a single wavelength, can be performed and still very accurately estimate the UV Index regardless of the time, day and/or location of the sensor when measurements are made. This can thus greatly simplify the devices and/or methods that can be used to accurately estimate UV index. FIGS. 7A and 7B shows the percentage of UV index calculation that falls between 1% (black) and 90% derived from single-wavelength irradiance (data, UV Net). FIG. 7B shows the same calculation, but focused on the relevant wavelengths. The data is from an independent dataset taken with a different spectrometer in Boulder Colo., May of 2016.

Figure 8A:
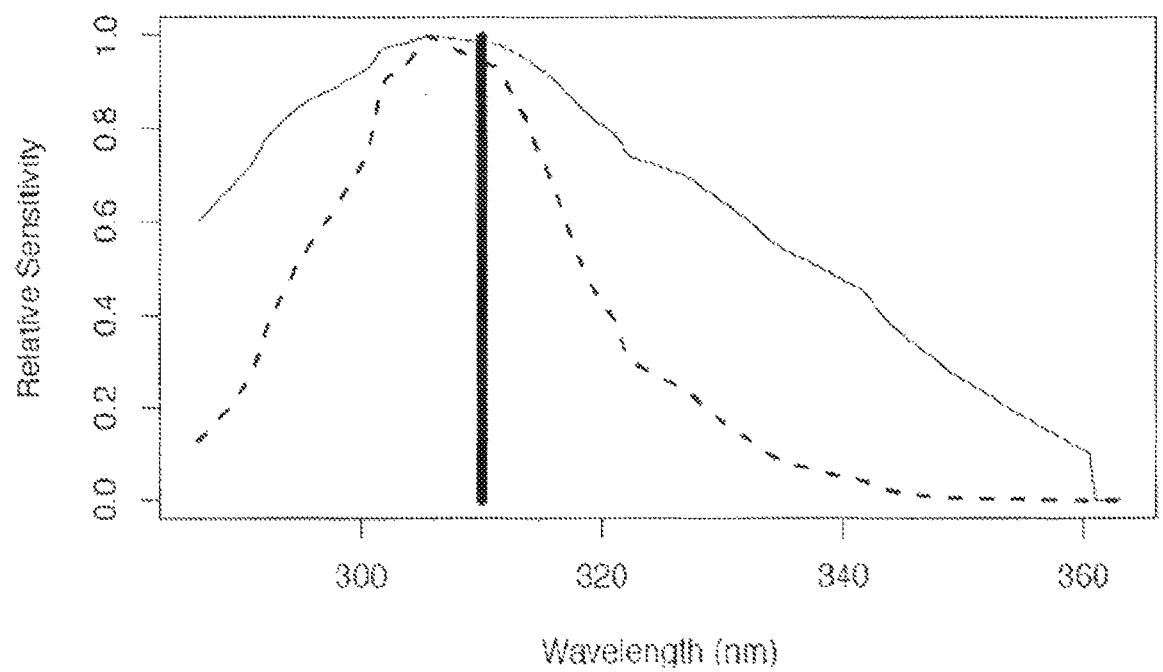
FIGS. 8A and 8B show the sensitivity curves of silicon carbide, SiC4, and a perfect 311 nm detector.
Figure 8B:
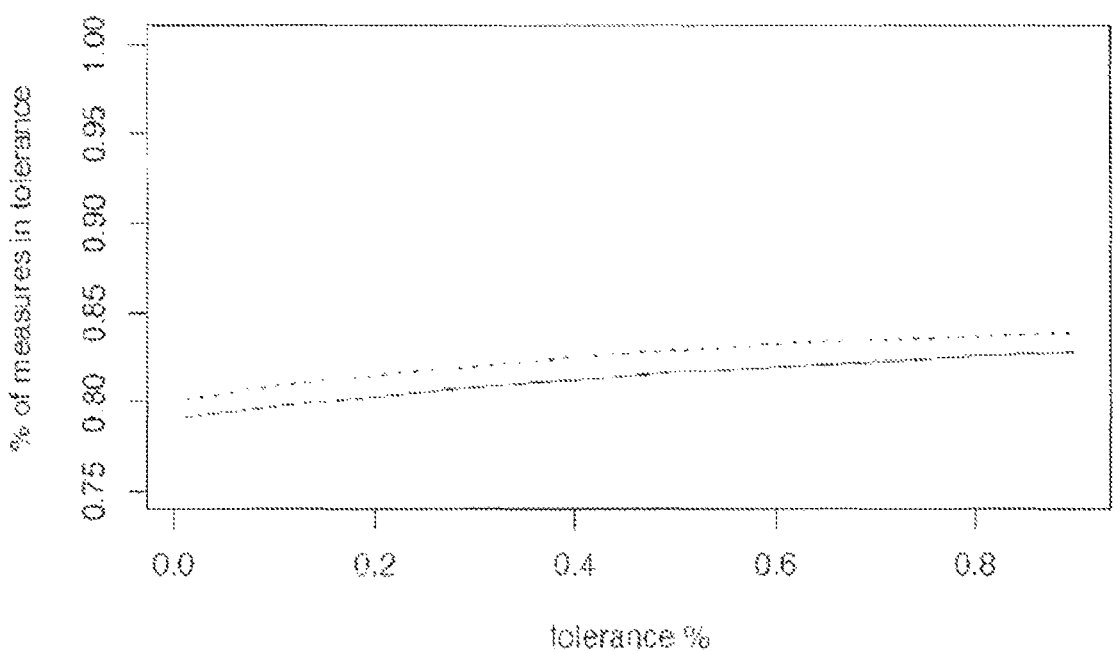

Detectors' unfiltered sensitivity to UV. Silicon carbide diodes are amongst the most common UV detectors because of their sensitivity across the UVB range (these detectors peak at 275 nm). By itself, this makes a good but not an optimal detector as is disclosed herein. In this analysis, a comparison was made between the predicted performance of three detectors, which is shown in FIG. 8. FIG. 8A illustrates SiC (solid non-straight line), a highly peaked SiC called SiC4 (SiC4(lambda)=SiC^4), shown in the dotted line, and an ideal 310 nm detector, which is the vertical line. FIG. 8A shows the sensitivity curves of Silicon Carbide, SiC4, and a perfect 311 nm detector. Merely reducing the width of the spectral sensitivity curve only marginally improves performance (i.e., from the SiC detector to the highly peaked SiC detector), which is shown in more detail in FIG. 8B. FIG. 8B illustrates the real-world accuracy of these diodes from FIG. 8A calculated using the UVNet dataset showing the benefit of the present disclosure. The top solid line in FIG. 8B is the 311 nm detector, and the bottom line is the SiC detector.

Figure 9:
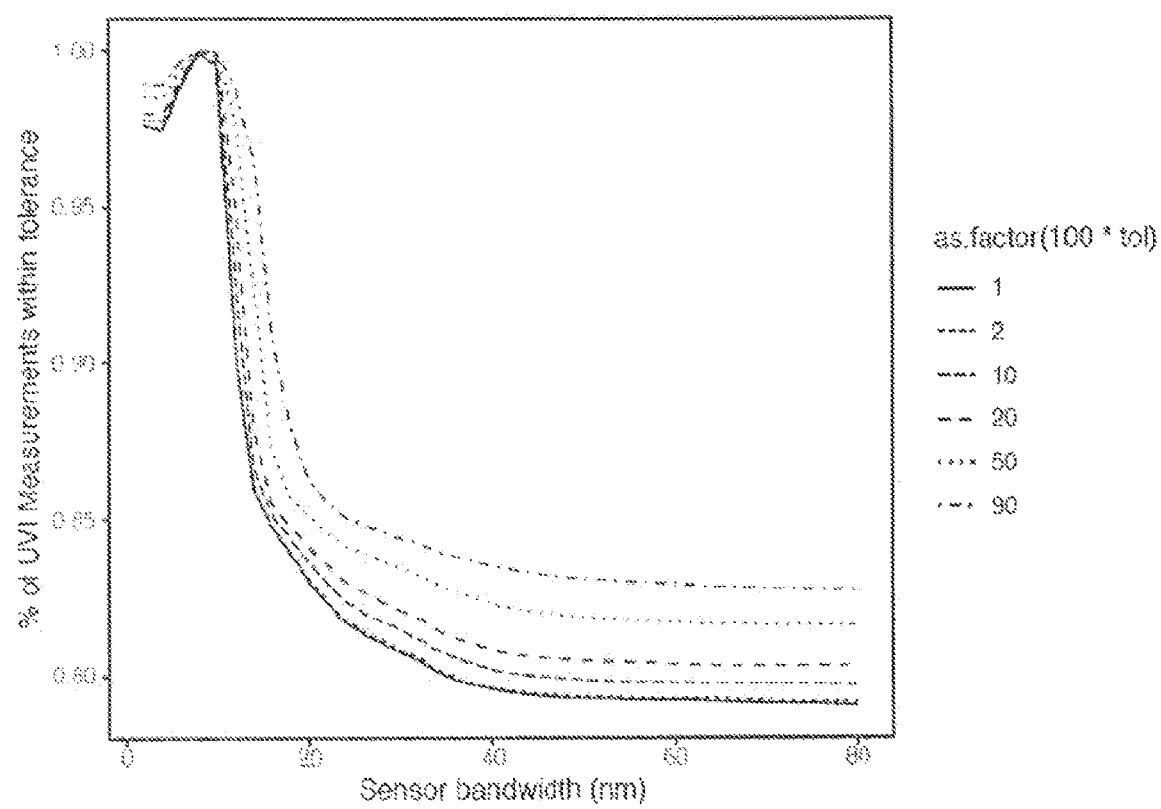
FIG. 9 shows real world accuracy versus the acceptance range (bandwidth) of a sensor.

Further, a consideration was made regarding how broad the wavelength range is that provides the greatest sensitivity by estimating UV based on the total light levels in the range 311-w/2 to 311+w/2 in the plot in FIG. 9. The several types of lines correspond to the tolerance of a "correct measurement", i.e. the curve @ tolerance 1% means that the UVI measurement should be within 1% to be deemed accurate. FIG. 9 shows real world accuracy versus the acceptance range (bandwidth) of a sensor, showing that the preferred sensor would be responsive over the range 305-315 nm and would exclude light outside that range, and that sensors that respond similarly to light inside than outside the range of 305-315 fail to take advantage of the inventive concepts described herein. This disclosure thus provides light sensors that are more responsive, or more sensitive, to light with 305 nm-315 nm wavelengths than to light outside of that range. In more particular embodiments, this disclosure provides light sensors that are more responsive, or more sensitive, to light with 308 nm-312 nm wavelengths than to light outside of that range. Sensors adapted in this manner is one way in which to realize the benefits of the significant findings described herein.

Validating the theory. To validate the theory set forth above, an exemplary light sensor was built with a silicon carbide chemistry (sensitive to at least 311 nm), a narrow-band filter centered on 312 nm with a width of 1.5 nm, and a UV-pass diffuser on top of the filter. It is understood that the validating prototype supports and illustrates the inventive methods herein, and the inventive concepts herein are not limited to this particular type of device and/or system. Other devices and/or systems are envisioned that could be used to take advantage of the innovative and nonobvious methods and concepts disclosed herein.

Figure 10C:
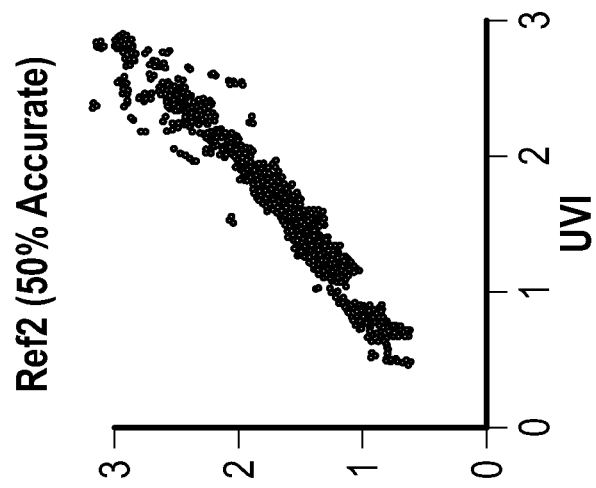
FIGS. 10A, 10B, and 10C illustrate accuracy of a prototyped sensor and two off-the-shelf sensors.
Figure 10B:
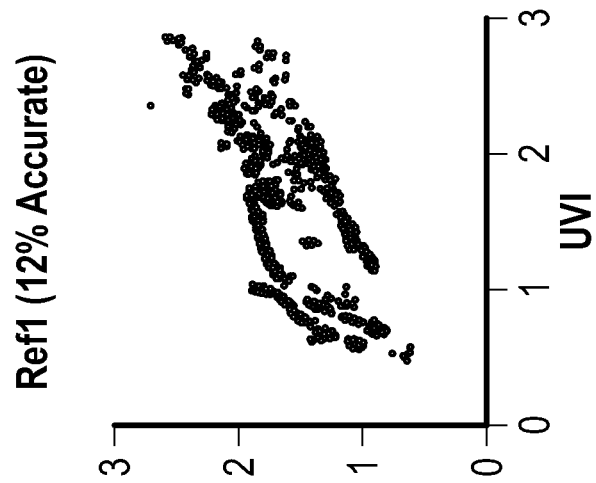
Figure 10A:
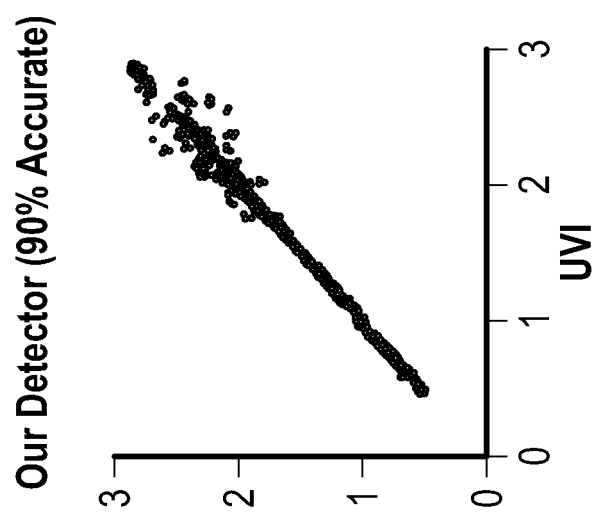

This illustrative and exemplary prototype was assembled, as were two popular off-the-shelf, low-cost detectors specifically designed to measure the UV index, according to their manufacturer, referred to in this example as Ref 1 and Ref 2. Their responses against the UV index was measured by a laboratory-grade UV radiometer designed to measure the UV index, with the results shown in FIGS. 10A, 10B, and 10C. By defining "accuracy" with the percentage of measurements within 5% of the correct value, we find that the prototype is 90% accurate, when Ref 1 was 12% accurate and Ref 2 was 50% accurate.

Atmospheric science justification. The theory and its validation described above is surprising and has not been previously noted by experts in the field. Below, we propose a physical-chemical explanation. The observed solar spectrum at time t is a result of multiple processes: 1) the generation of a solar emission spectrum H (λ, t) from the sun. The solar emission spectrum is a combination of black body spectra from regions of the sun whose temperature vary across the solar surface and modified by absorption of solar gasses, primarily hydrogen, whose absorption spectrum is also dependent on pressure and temperature; 2) the transport of the solar spectrum to a spot x earth T(λ, x, t) which has a geometric dependence on the solar azimuth at (x, t) but also on the absorption and scattering of the atmosphere which in turn depends on the local and immediate concentrations of ozone [$O_3$] and water [$H_2O$] as well as the scattering off aerosolized water vapor and other particles in the atmosphere and clouds. We note that the theoretical understanding and numerical modeling of radiation transfer through the atmosphere is a topic of considerable complexity that has been studied in great detail.

On the ground, we observe a spectrum S(λ, x, t)=H(λ, t)T(λ, x, t) where the complex angular dependence of indwelling radiation is included in the functions H and T.

We desire to track the UVI which is an integral over S weighted by the erythema action spectrum E, $$U=\int_{280}^{400} d\lambda S(\lambda,x,t)E(\lambda)=\int_{280}^{400}d\lambda H(\lambda,t)T(\lambda,x,t)E(\lambda) \quad \text{(Equation 1).}$$

We make the intuitive and unjustified assumption that it is acceptable to neglect all sources of variance except for the total quantity of ozone and water encountered resulting in the hypothesis that $$U=\int_{280}^{400}d\lambda H(\lambda,t)E(\lambda)O(n_{O_3},\lambda)W(n_{H_2O},\lambda) \quad \text{(Equation 2).}$$

For further analysis it is simpler to examine a monotonically related quantity, the integral of the logarithm of the desired quantity which we will call Log(U) even though it is not exactly the logarithm of the UVI.

$$\text{Log}(U)=\int_{280}^{400}d\lambda[\text{Log } H(\lambda,t)+\text{Log } E(\lambda)+\text{Log } O(n_{O_3}(t,x),\lambda)+\text{Log } W(n_{H_2O}(t,x),\lambda)] \quad \text{(Equation 3).}$$

$$\text{Log}(U)=C+\int_{280}^{400}d\lambda[\text{Log } O(n_{O_3}(t,x),\lambda)+\text{Log } W(n_{H_2O}(t,x),\lambda)] \quad \text{(Equation 4).}$$

As absorption coefficients are typically simply proportional to the number of molecules encountered we can further simplify $$\text{Log}(U)=C+n_{O_3}(t,x)\int_{280}^{400}d\lambda \text{ Log } O(\lambda)+n_{H_2O}(t,x)\int_{280}^{400}d\lambda \text{ Log } W(\lambda) \quad \text{(Equation 5).}$$

The existence of an indicator wavelength, where a measure of its intensity is predictive of the complete function is now reduced to finding a wavelength at which the two integrands in (Equation 5) are equal O(λ)=W(λ). In practice, as the absorption spectra depend on temperature and pressure, both of which vary along the path taken by sunlight as it travels to the ground, one would reasonably doubt that such a wavelength exists, and also expect that if it did exist, this key wavelength would vary widely with time. The inventive concepts herein are based on the unexpected discover and realization that the drift of the critical wavelength is only over a remarkably narrow range across a wide range of conditions including weather, geography, and geometric position of the sun in the sky.

Figure 11:
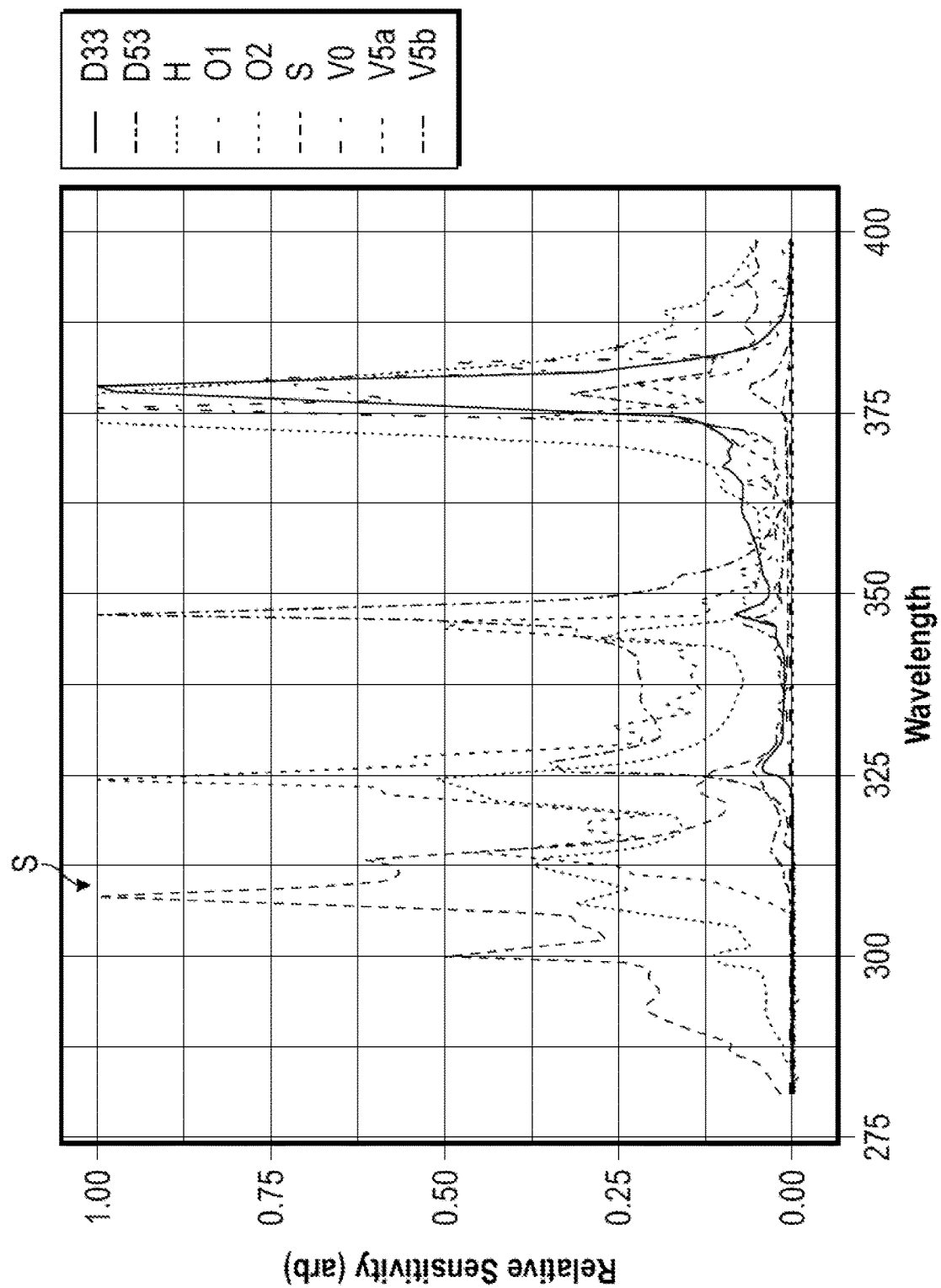
FIG. 11 shows the spectral sensitivity of some commercially-available low-cost UV sensors.

Available sensors. As part of the NSF SBIR research, a university laboratory checked the spectral response function of every commercially available solid-state UV sensor that could easily be acquired. The results are presented FIG. 11, over the range of 280-400 nm, which shows the spectral sensitivity of commercially-available low-cost UV sensors as of the summer of 2018. As seen in FIG. 11, the sensor S has a peak of sensitivity near 310 nm but retains more than 10% of relative sensitivity from ~285 nm to ~325 nm. Some of the inventive methods and sensors herein filter out wavelengths outside the range of 305 nm-315 nm. FIG. 12 shows the illustrative sensors and the accuracy at 1% tolerance.

Among the three popular chemistries used in UV photodiodes (silicon carbide, gallium nitride, or aluminum gallium nitride), silicon carbide naturally exhibits a peak sensitivity at 275 nm and remains relatively flat from 275 nm to 315 nm, making it an ideal chemistry for the methods and/or sensors herein. It is expected that other semiconductors (e.g. compound semiconductors) would still be valid choices for the inventive concepts herein, even though the disclosure herein describes a prototype with a silicon carbide chemistry. If "compound semiconductor" is used in a particular context herein, it is understood to be illustrative, and the relevant portion of the application also described "semiconductor."

An exemplary method of achieving a high accuracy when estimating the UV index with a wide variety of detectors follows. The method includes selecting or providing a semiconductor that is sensitive to at least 311 nm. The semiconductor can be sensitive to other wavelengths, but it must show sensitivity around 311 nm. A narrow-band filter centered on 311 nm is assembled above the semiconductor. An optional diffuser, which are known to those skilled in the art, may be disposed above the filter. The assembled detector is calibrated against a state-of-the-instrument known to measure accurately the UV index.

Figure 2:
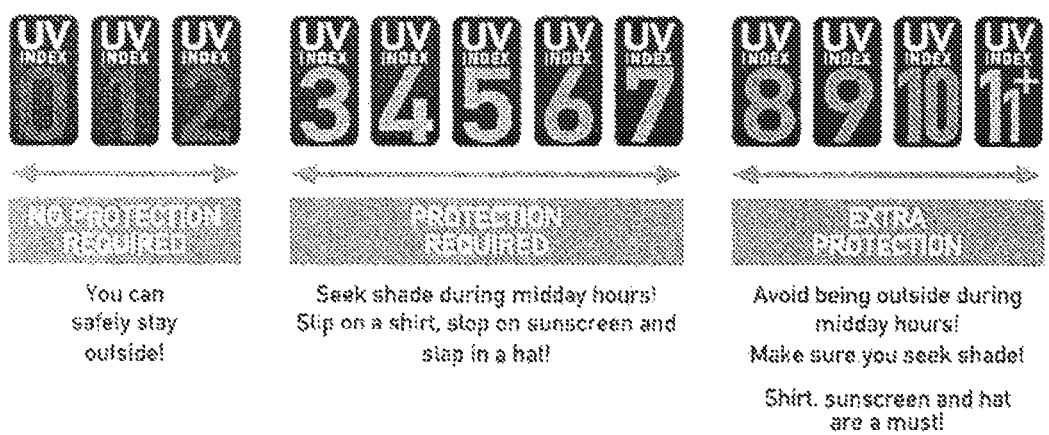
FIG. 2 illustrates WHO Recommendations based on the UV index.
Figure 3:
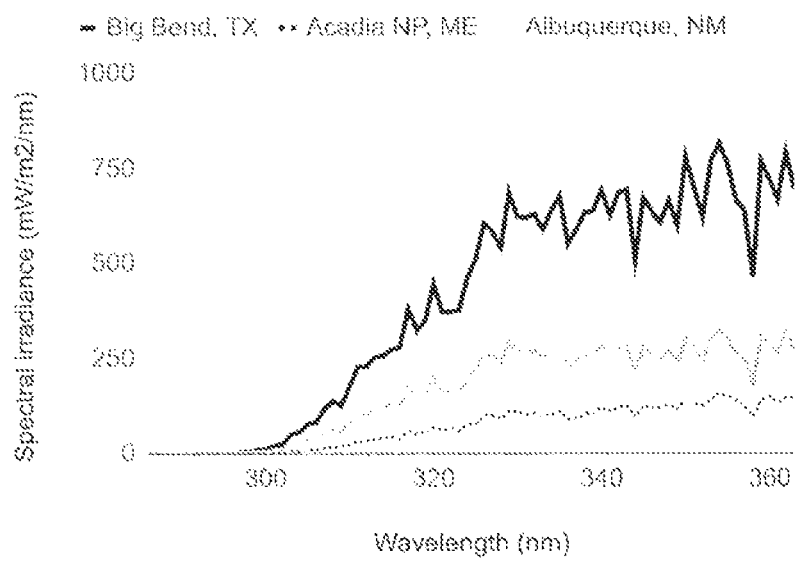
FIG. 3 illustrates measured UV spectral irradiance at the same time from three different locations.
Figure 4:
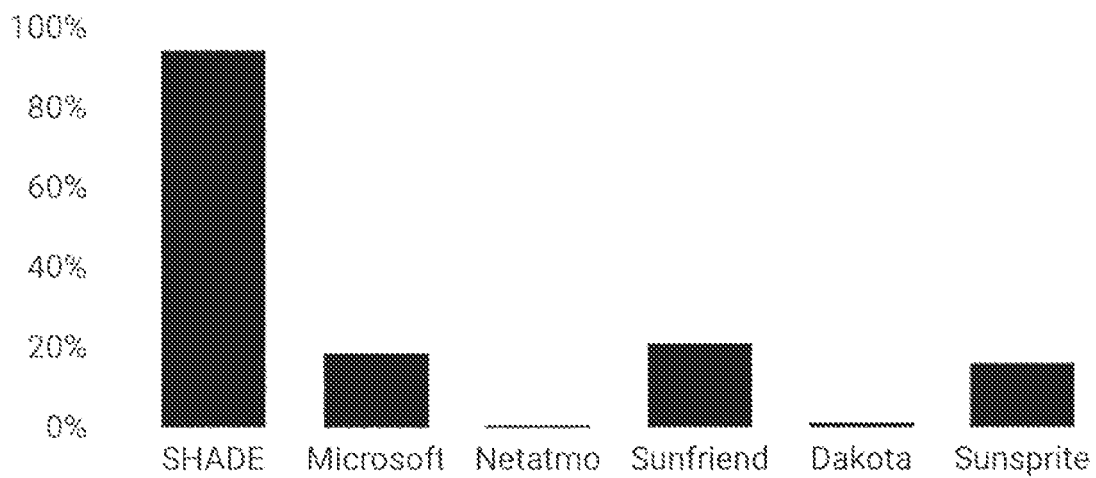
FIG. 4 illustrates a comparison of commercially-available personal UV sensors when measuring the UV index from sunlight.
Figure 5:
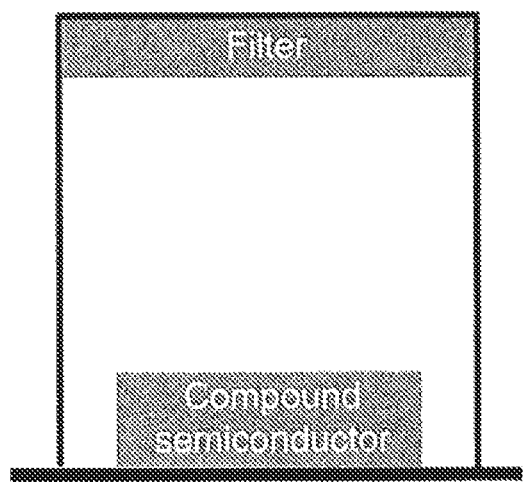
FIG. 5 illustrates the basic architecture of an exemplary UV sensor.

The method above may include other steps as well, and is not meant to be limiting. For example, the assembled device may include other sensors, such as visible light sensors or sensors specifically adapted for UVA. The assembled device may thus clearly include other components and electronics, such as any of those described in 2016/0364131, which is incorporated by reference herein for all purposes. For example, FIG. 2 in 2016/0364131 illustrates an exemplary sensing device. Sensor 107 from 2016/0364131 could be considered any of the photodetectors herein, and any of the narrow-pass filters herein could be added to the sensing device in FIG. 2 above sensor 107. Optional diffuser 102 may be used as the optional diffuser set forth herein. The sensing device could optionally include any of the components from that FIG. 2 (e.g., including UVA sensor 109, or any of the windows 106), or it could include less or none of the other components and/or electronics.

The following describes an exemplary method of estimating UV Index using the inventive concepts herein. When measuring sun exposure at a given time T, a computer executable program (e.g., stored on a wide variety of devices, such as a personal smartphone, a wearable sensing device, a desktop computer, a cloud-based storage device, etc.) can be used to provide the estimate of the UV index, based on what the detector is measuring: UVI(T)=$UVI_{CAL}$× I(T)/$I_0$, where UVI(T) is the estimated UV index of sun exposure at the time T, where UVI$_{CAL}$ is the UV index measured by the reference instrument under the irradiance used during calibration, where I(T) is the current of the detector when measuring sun exposure at the time T, where I$_0$ is the current of the detector when measuring the irradiance used during calibration, with the same conditions as the reference instrument. In this example, current is the output that is measured, but it is understood this is illustrative, and the output of the UV sensor may be other types of outputs, such as digital counts, for example. Note that if the detector is using a digital communication channel, its output is usually a number of counts, not a current. In that case the calibration function should be modified accordingly.

Figure 13:
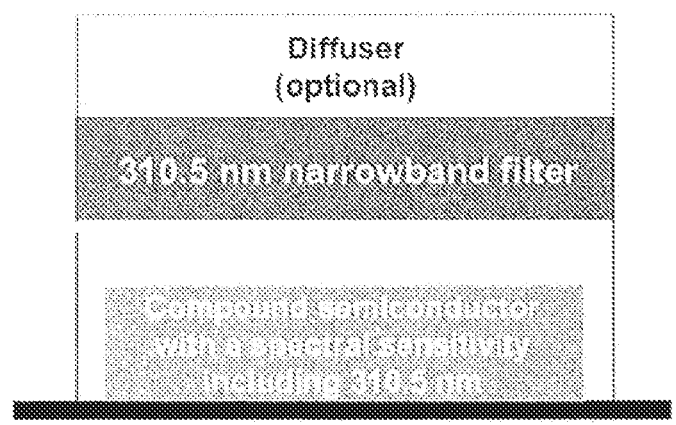
FIG. 13 illustrates exemplary schematics of any of the sensors herein that are designed to measure, for example, UV index.

FIG. 13 illustrates exemplary schematics of any of the UV detectors herein that are designed to measure the UV index. It is noted that a diffuser is optional, but when prototyped, it did improve performance of the sensor.

It was observed that the broader the sensitivity around 310 nm is, the less accurate the sensors will be. It is also noted that the sensitivity does not have to be symmetrical around 310 nm. The UV index is mostly derived from the wavelengths 290-315 nm, so if the filter is passing 310-320 nm, it may also be very accurate. A filter passing 290-310 nm, however, will be less accurate because the shorter wavelengths (290-315) contribute significantly to the UV index.

This devices herein are adapted to measure the UV index outside, where there is irradiance around 310 nm. Inside a car or a building, for example, UVA (315-400 nm) can go through a window and will mostly likely not be sensed by a detector using a narrow-band around 310 nm or 311 nm. Any of the sensing devices herein can therefore also include one or more UVA sensors near the modified detector for any situations where the device is exposed mostly to UVA and not much UVB (e.g., sunlight through windows, UVA machines, etc.). For example, any of the components described in 2017/0115162 are fully incorporated by reference herein for all purposes, including, for example, any of the sensors, electronics, computer executable methods, and any description related thereto.

Figure 14:
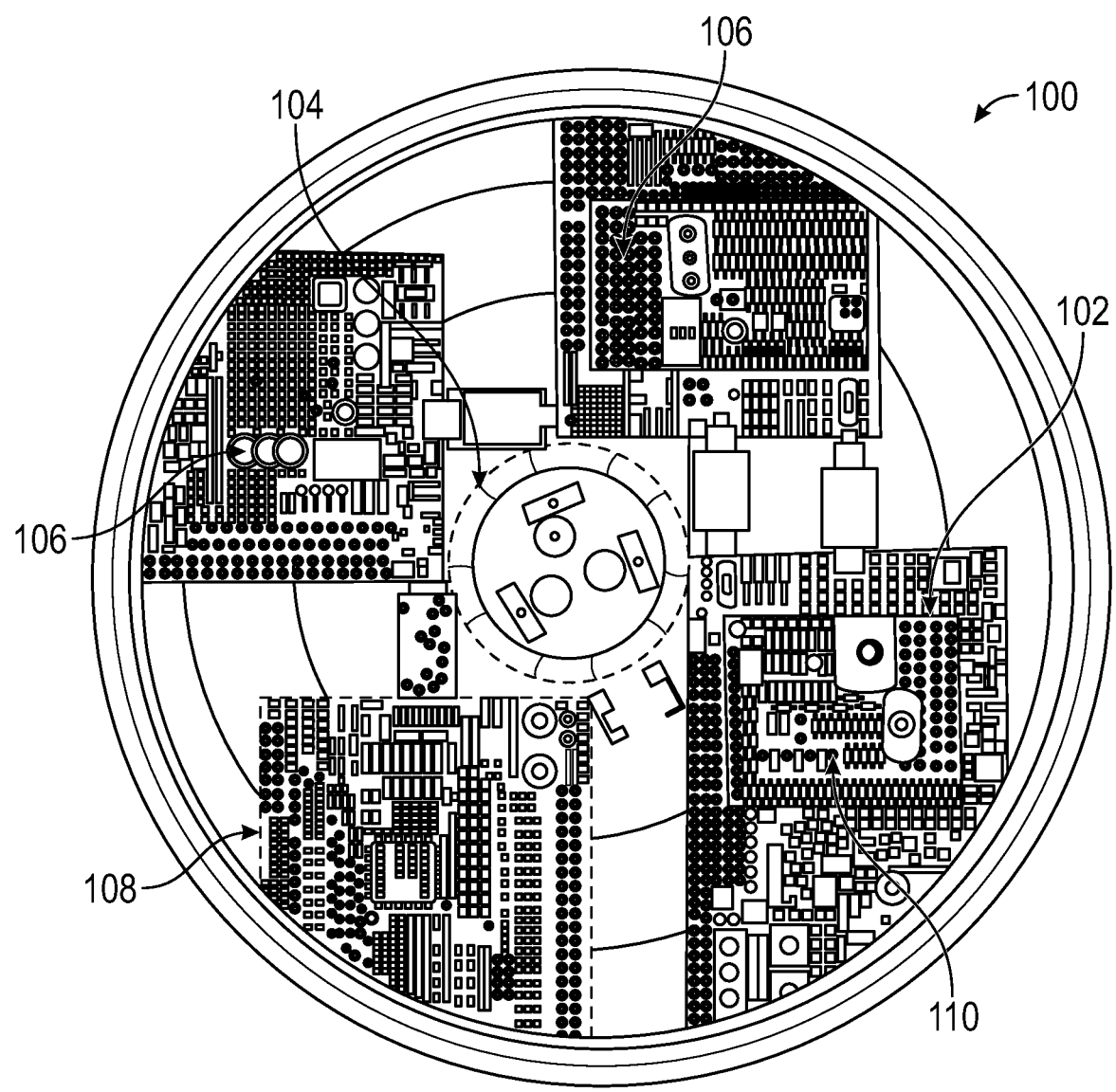
FIG. 14 illustrates an exemplary assembly device, including a sensor and other optional components.

FIG. 14 illustrates an exemplary assembly device 100 that includes exemplary sensor 102, which may include a semiconductor such as a SiC semiconductor, and a narrowband filter mounted above the semiconductor. Sensor 102 can be any sensor herein. Assembly device also includes reference radiometer 104. Device 100 also includes optional control systems 106. Device 100 also includes control 108, which acts as the interface and control system for all sensors in device 100. An optional second sensor 102' may be included in the device 100. An optional UVA sensor 110 is also included in assembly device 100. FIG. 15 shows device 100, but includes optional diffuser 120. The internal components that are shown in FIG. 14 cannot be seen in FIG. 15.

FIG. 16 illustrates an exemplary method of estimating UV Index. A sensor is provided at step 132. The sensor may be any of the innovative sensors described herein. The sensor's output from a calibration source is measured in step 134. The UV Index for an unknown source is then determined at step 136.

Figure 17:
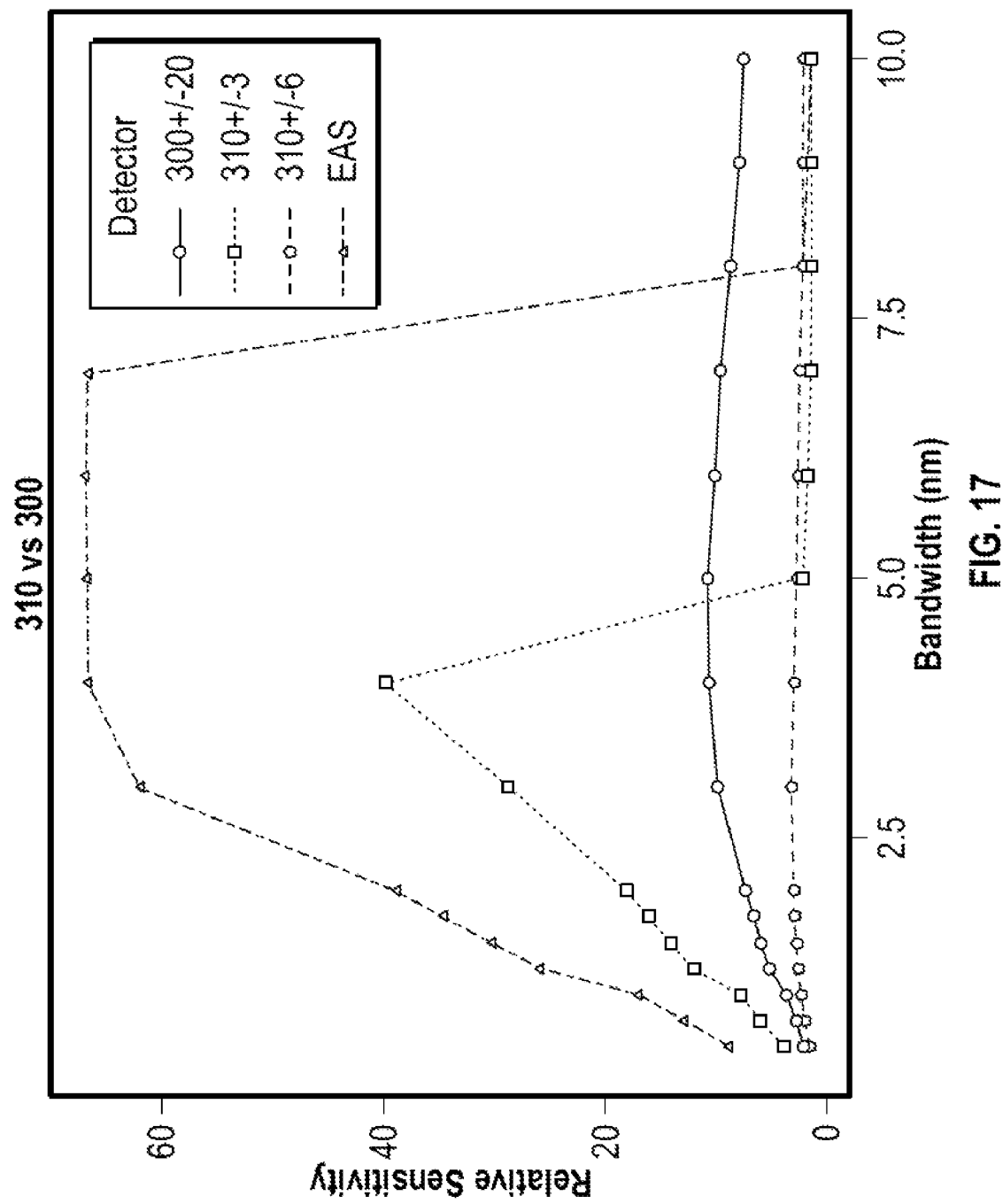
FIG. 17 illustrates relative "minus" sensitivity (S310/S300) vs bandwidth for a variety of sensors.
Figure 18:
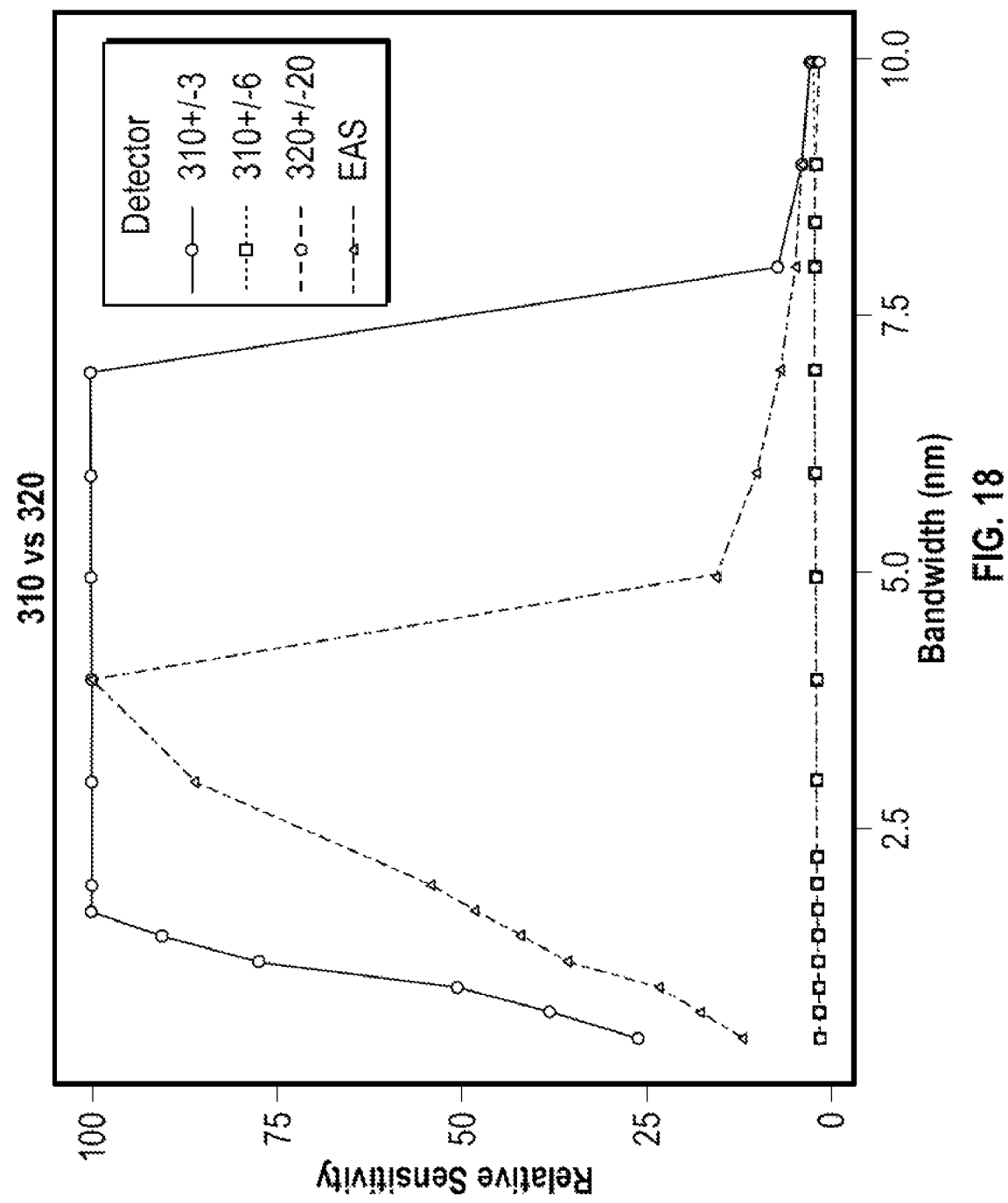
FIG. 18 illustrates relative "plus" sensitivity (S310/S320) vs bandwidth for a variety of sensors.

The disclosure that follows, including FIGS. 17 and 18, provides a quantitative illustration of sensors and methods that fall within the scope of the inventive concepts herein. The disclosure that follows provides alternative ways of characterizing the inventive sensors herein, as well as the inventive methods herein. FIGS. 17 and 18, and the descriptions thereof, also describe a quantitative test to separate systems using the key inventive concepts described herein from systems which use prior understandings of how to quantify health relevant UV.

A comparison would be made of the responses of a system when measuring sun spectra through several notch filters with transmission centers at or near 300, 310, and 320 nm. Notch filters block light outside of a narrow bandwidth around their center. The filters can be chosen to have a bandwidth to pass light with wavelength between 1 and 10 nm of the notch filter centers. For each filter, the system response can be recorded when exposed to two sources of incident light: 1/U$_1$ unfiltered sunlight or a solar spectrum passing through a diffuser and 2/U$_2$ that same source plus additional sunlight or solar spectra passing through a similar path with the addition of a notch filter. The "sensitivity of the system" can be measured for each filter. The sensitivity is the percent change in output between U$_1$ and U$_2$ (S=(U$_2$−U$_1$)/U$_1$=U$_2$/U$_1$−1). The relative sensitivity of the detector is the ratio of S(310) to S(300) or S(310) to S(320). In FIG. 17, we plot this ratio of sensitivities as a function of the bandwidth of the notch filters. We call R$_{310}$_minus=S(310)/S(300), and R$_{310}$_plus=S(310)/S(320). All previous approaches and previous devices have the property that both of R$_{310}$_minus and R$_{310}$_plus are less than 15. A system taking advantage of the inventive concepts herein will have either R$_{310}$_plus >15 or R$_{310}$_minus >15 or both. Thus, any of the innovative sensors herein can further be characterized as having either R$_{310}$_plus >15 or R$_{310}$_minus >15, or both.

FIG. 17 shows measuring the ratio of sensitivities of a detector to filters centered on 310 nm vs filters centered on 300 nm for different bandwidths (1 nm to 10 nm). A bandwidth of 5 nm for a filter centered on 310 nm means that the filter filters in light between 305 nm and 315 nm. We note on this graph that a detector exhibiting the perfect erythema spectrum or sensitive from 280 nm to 320 mn are not part of this disclosure and inventions herein because their relative sensitivities R$_{310\_minus}$ are below 15. A detector with a sensitivity from 304 nm to 316 nm and from 307 nm to 313 nm would have, for one or several bandwidths, a relative sensitivity R$_{310\_minus}$ above 15. Therefore they are described by the inventive concepts herein.

FIG. 18 illustrates measuring the ratio of sensitivities of a detector to filters centered on 310 nm vs filters centered on 320 nm for different bandwidths (1 nm to 10 nm). A bandwidth of 5 nm for a filter centered on 310 nm means that the filter filters in light between 305 nm and 315 nm. We note on this graph that a detector exhibiting the perfect erythema spectrum or sensitive from 300 nm to 340 mn are not part of this disclosure and invention because their relative sensitivities R$_{310\_plus}$ are below 15. A detector with a sensitivity from 304 nm to 316 nm and from 307 nm to 313 nm would have, for one or several bandwidths, a relative sensitivity R$_{310\_plus}$ above 15. Therefore they are described by the inventive concepts herein.

Figure 19:
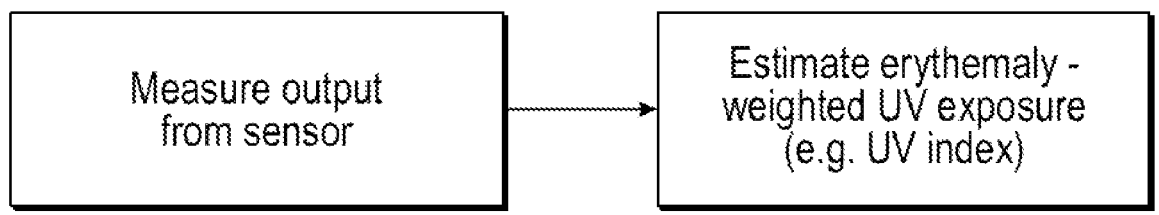
FIG. 19 illustrates an exemplary method of estimating erythemaly-weighted UV exposure.

FIG. 19 illustrate an exemplary method that includes measuring output from any of the sensors herein, and also includes using the output to estimate an erythemaly-weighted UV exposure (e.g. UV Index).

Figure 20:
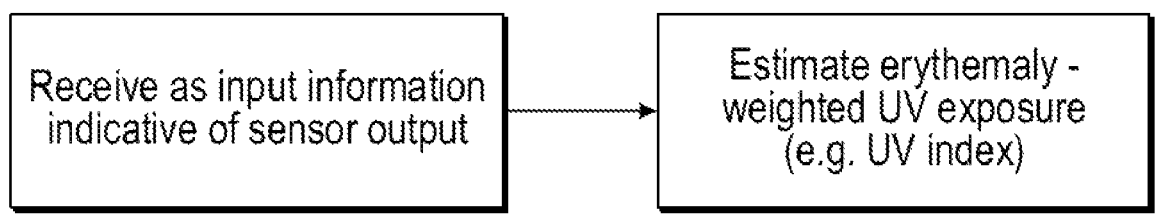
FIG. 20 illustrates an exemplary method of estimating erythemaly-weighted UV exposure.

FIG. 20 illustrates an exemplary computer executable method, that may be stored in a memory (which may be disposed in any type of suitable device), the computer executable method including receiving as input information that is indicative of (or is) a sensor output, where the information is then used to estimate an erythemaly-weighted UV exposure (e.g. UV Index).

Figure 21:
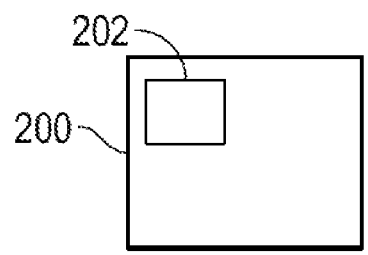
FIG. 21 illustrates an exemplary device in which a memory may be disposed, wherein the memory may store thereon any of the executable methods herein.

FIG. 21 illustrates an exemplary device 200 (e.g. computer, smartphone, server, etc.) that includes memory 202, in which any of the executable methods herein may be stored.

Any of the methods herein that estimate an erythemaly-weighted UV exposure (e.g., UV Index) may further include any known use of the that erythemaly-weighted UV exposure (e.g., UV Index). Any of the ways in which UV index is used in any of the publications incorporated by reference herein are thus expressly incorporated into this disclosure. For example without limitation, any of the methods herein can include determining how much time a person may safely spend outdoors by utilizing the erythemaly-weighted UV exposure (e.g., UV Index), and/or alerting the user to that amount of time. For example, any of the methods herein can include a step that causes the erythemaly-weighted UV exposure (e.g., UV Index) to be displayed on a display of a user device (e.g. smartphone, computer, etc.). These are merely examples, and any known uses of erythemaly-weighted UV exposure (e.g., UV Index), including providing information to a user, are expressly included herein.

Even if not specifically indicated, one or more methods or techniques described in this disclosure (e.g. any of the computer executable methods) may be implemented, at least in part, in hardware, software, firmware or any combination thereof. For example, various aspects of the techniques or components may be implemented within one or more processors, including one or more microprocessors, digital signal processors (DSPs), application specific integrated circuits (ASICs), field programmable gate arrays (FPGAs), programmable logic circuitry, or the like, either alone or in any suitable combination. The term "processor" or "processing circuitry" may generally refer to any of the foregoing circuitry, alone or in combination with other circuitry, or any other equivalent circuitry.

Such hardware, software, or firmware may be implemented within one device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as random access memory (RAM), read only memory (ROM), non-volatile RAM (NVRAM), electrically erasable programmable ROM (EEPROM), Flash memory, and the like. The instructions may be executed by a processor to support one or more aspects of the functionality described in this disclosure.

What is claimed is:

1. A system adapted for use in estimating erythemaly-weighted UV exposure:
   a sensor that is more sensitive to light with a wavelength from 305 nm to 315 nm than to light with a wavelength outside of 305 nm to 315 nm; and
   a non-transitory memory having stored therein a computer executable method, the computer executable method adapted to receive as input information that is indicative of an irradiance measured from the sensor, and to estimate erythemaly-weighted UV exposure using the information.

2. The system of claim 1, wherein the sensor comprises a semiconductor and an optic portion, and wherein the combination of the semiconductor and the optic portion makes the sensor more sensitive to light with a wavelength from 305 nm to 315 nm than to light with a wavelength outside of 305 nm to 315 nm.

3. The system of claim 1, wherein the sensor is more sensitive to light with a wavelength from 308 nm to 312 nm than to light with a wavelength outside of 308 nm to 312 nm.

4. The system of claim 1, wherein the sensor comprises a narrow-band filter disposed above a semiconductor.

5. The system of claim 1, further comprising a wearable device in which the sensor is disposed and secured.

6. The system of claim 1, further comprising a personal device in which the sensor is disposed and secured.

7. The system of claim 1, further comprising a personal device that includes a display, the personal device configured with electronics to display the estimated erythemaly-weighted UV exposure.

\* \* \* \* \*